US012718101B2

(12) United States Patent
Lin et al.

(10) Patent No.: US 12,718,101 B2
(45) Date of Patent: Aug. 25, 2026

(54) COMPRESSION OF MACHINE LEARNING MODELS

(71) Applicant: Adobe Inc., San Jose, CA (US)

(72) Inventors: Zhe Lin, San Jose, CA (US); Yilin Wang, San Jose, CA (US); Siyuan Qiao, San Jose, CA (US); Jianming Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1569 days.

(21) Appl. No.: 16/563,226

(22) Filed: Sep. 6, 2019

(65) Prior Publication Data

US 2021/0073644 A1 Mar. 11, 2021

(51) Int. Cl.
*G06N 3/084* (2023.01)
*G06N 3/04* (2023.01)

(52) U.S. Cl.
CPC ............... *G06N 3/084* (2013.01); *G06N 3/04* (2013.01)

(58) Field of Classification Search
CPC ........ G06N 3/084; G06N 3/04; G06N 3/0454; G06N 3/082; G06F 7/483
See application file for complete search history.

(56) References Cited

U.S. PATENT DOCUMENTS

2020/0364573 A1* 11/2020 Ramachandran ...... G06N 3/063

OTHER PUBLICATIONS

Molchanov, Pavlo, et al. “Importance estimation for neural network pruning.” Proceedings of the IEEE/CVF Conference on Computer Vision and Pattern Recognition. 2019. (Year: 2019).*
Liu, Zhuang, et al. “Learning efficient convolutional networks through network slimming.” Proceedings of the IEEE international conference on computer vision. 2017. (Year: 2017).*
Gordon, Ariel, et al. “Morphnet: Fast & simple resource-constrained structure learning of deep networks.” Proceedings of the IEEE conference on computer vision and pattern recognition. 2018. (Year: 2018).*
Lin, S. et al., “Towards optimal structured CNN pruning via generative adversarial learning,” downloaded from <arxiv.org/abs/1903.09291> (Mar. 22, 2019) 10 pp. (Year: 2019).*
(Continued)

*Primary Examiner* — Brian M Smith
(74) *Attorney, Agent, or Firm* — Nicholson De Vos Webster & Elliott LLP

(57) ABSTRACT

A machine learning model compression system and related techniques are described herein. The machine learning model compression system can intelligently remove certain parameters of a machine learning model, without introducing a loss in performance of the machine learning model. Various parameters of a machine learning model can be removed during compression of the machine learning model, such as one or more channels of a single-branch or multi-branch neural network, one or more branches of a multi-branch neural network, certain weights of a channel of a single-branch or multi-branch neural network, and/or other parameters. In some cases, compression is performed only on certain selected layers or branches of the machine learning model. Candidate filters from the selected layers or branches can be removed from the machine learning model in a way that preserves local features of the machine learning model.

20 Claims, 13 Drawing Sheets

(56) References Cited

OTHER PUBLICATIONS

A. Krizhevsky, I. Sutskever, and G. E. Hinton, "Imagenet classification with deep convolutional neural networks," in Advances in Neural Information Processing Systems 25 (F. Pereira, C. J. C. Burges, L. Bottou, and K. Q. Weinberger, eds.), pp. 1097-1105, 2012.
L. Chen, G. Papandreou, I. Kokkinos, K. Murphy, and A. L. Yuille, "Deeplab: Semantic image segmentation with deep convolutional nets, atrous convolution, and fully connected crfs," IEEE Trans. Pattern Anal. Mach. Intell., vol. 40, No. 4, pp. 834-848, 2018.
J. Ye, X. Lu, Z. Lin, and J. Wang, "Rethinking the smaller-norm-less-informative assumption in channel pruning of convolution layers," CoRR, vol. abs/1802.00124, 2018.
Z. Liu, J. Li, Z. Shen, G. Huang, S. Yan, and C. Zhang, "Learning efficient convolutional networks through network slimming," in IEEE International Conference on Computer Vision, ICCV 2017, Venice, Italy, Oct. 22-29, 2017, pp. 2755-2763, 2017.
C. Szegedy, W. Liu, Y. Jia, P. Sermanet, S. Reed, D. Anguelov, D. Erhan, V. Vanhoucke, and A. Rabinovich, "Going deeper with convolutions," in Proceedings of the IEEE conference on computer vision and pattern recognition, pp. 1-9, 2015.
C. Liu, B. Zoph, M. Neumann, J. Shlens, W. Hua, L.-J. Li, L. Fei-Fei, A. Yuille, J. Huang, and K. Murphy, "Progressive neural architecture search," in Proceedings of the European Conference on Computer Vision (ECCV), pp. 19-34, 2018.
S. Qiao, Z. Lin, J. Zhang, and A. Yuille, "Neural rejuvenation: Improving deep network training by enhancing computational resource utilization," arXiv preprint arXiv: 1812.00481, 2018.
K. He, X. Zhang, S. Ren, and J. Sun, "Deep residual learning for image recognition," in 2016 IEEE Conference on Computer Vision and Pattern Recognition, CVPR 2016, Las Vegas, NV, USA, Jun. 27-30, 2016, pp. 770-778, 2016.

* cited by examiner

530
W
(values)
H
(values)

| | | | | | | | |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

530

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

530

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

COMPRESSION OF MACHINE LEARNING MODELS

FIELD

This application is related to compressing machine learning models, while preserving local features of the machine learning models.

BACKGROUND

Artificial intelligence has become ubiquitous in many different industries. One artificial intelligence tool, machine learning, has become customary for performing a variety of tasks. A machine learning model can perform a task by relying on patterns and inference learned from training data, without requiring explicit instructions to perform the task. An example of a machine learning model is a neural network.

Deep neural networks have led to many state-of-the-art solutions for various tasks, such as for image recognition and object detection. In general, a deep neural network includes an input layer, multiple hidden layers, and an output layer. Despite the superior performance, deep neural networks can be over-parameterized in order to achieve good performance, which can result in a large amount of waste in computational resources. For example, it has been shown that a well-trained neural network can have many of the filters removed without affecting their performances. These findings suggest that deep neural networks trained with stochastic gradient descent can have unsatisfactory utilization of parameters.

Based on the findings that some filters of a neural network can be removed without affecting performance, there is a need for techniques that can prune neural networks more efficiently and more aggressively without introducing performances loss.

SUMMARY

Machine learning model compression systems and related techniques are described herein that can intelligently remove certain parameters of a machine learning model, without introducing a loss in performance of the machine learning model for a given task. An example of a machine learning model that can be compressed using the compression systems and techniques is a neural network, such as a neural network that has previously been trained. Various parameters of a machine learning model can be removed based on compression of the machine learning model. For example, one or more channels of a single-branch or multi-branch neural network can be removed, one or more branches of a multi-branch neural network can be removed, certain weights of a channel of a single-branch or multi-branch neural network can be pruned (e.g., set to 0), any combination thereof, and/or other parameters. In a single-branch neural network, each layer of the neural network receives the output from a previous layer. A multi-branch neural network includes multiple parallel branches (or layers) that provide outputs, which can be combined using techniques such as summation, concatenation, or other operation used to combine the outputs of the parallel branches. Each layer or branch can include multiple channels, and each channel can include at least a filter.

The machine learning model compression systems and techniques can select certain layers or branches from a neural network (e.g., layers or branches having a threshold number of weights, layers or branches having a threshold number of floating point operations (FLOPS) per layer or branch, and/or based on another metric associated with a complexity of a branch or layer), and can perform compression only on the selected layers or branches. Certain filters within the selected layers or branches can then be determined to be candidate filters (also referred to as removable filters). The candidate filters can be removed from the neural network in a way that preserves local features of the neural network. For example, the local features can be preserved by generating a copy of an original set of filters (referred to as a duplicate set of filters) of a selected layer or branch, and keeping the original set of filters fixed as duplicate filters are updated (e.g., as weights, scaling factors, and/or other parameters are updated) and as candidate filters are removed from the duplicate set of filters. Once the candidate filters are removed from the duplicate set of filters, the resulting compressed duplicate set of filters can replace the original set of filters in the neural network. The neural network with the compressed duplicate set of filters can be fine-tuned by re-training the neural network. In some cases, during the fine-tuning, only the parameters of the compressed duplicate set of filters will be re-trained, and the layers or branches that were not selected for compression are not re-trained.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Artificial intelligence (AI) refers generally to the ability of a machine or system to mimic intelligent human behavior. AI has existed for many decades, but has become a widespread phenomenon in recent years. Machine learning is a sub-area of AI, in which a machine learning model is trained to perform one or more specific tasks. For instance, a machine learning model is trained to perform a target task by relying on patterns and inference learned from training data, without requiring explicit instructions to perform the task. Machine learning models have become customary in many devices and systems for performing various tasks. One example of a machine learning model is a neural network.

Figure 1:
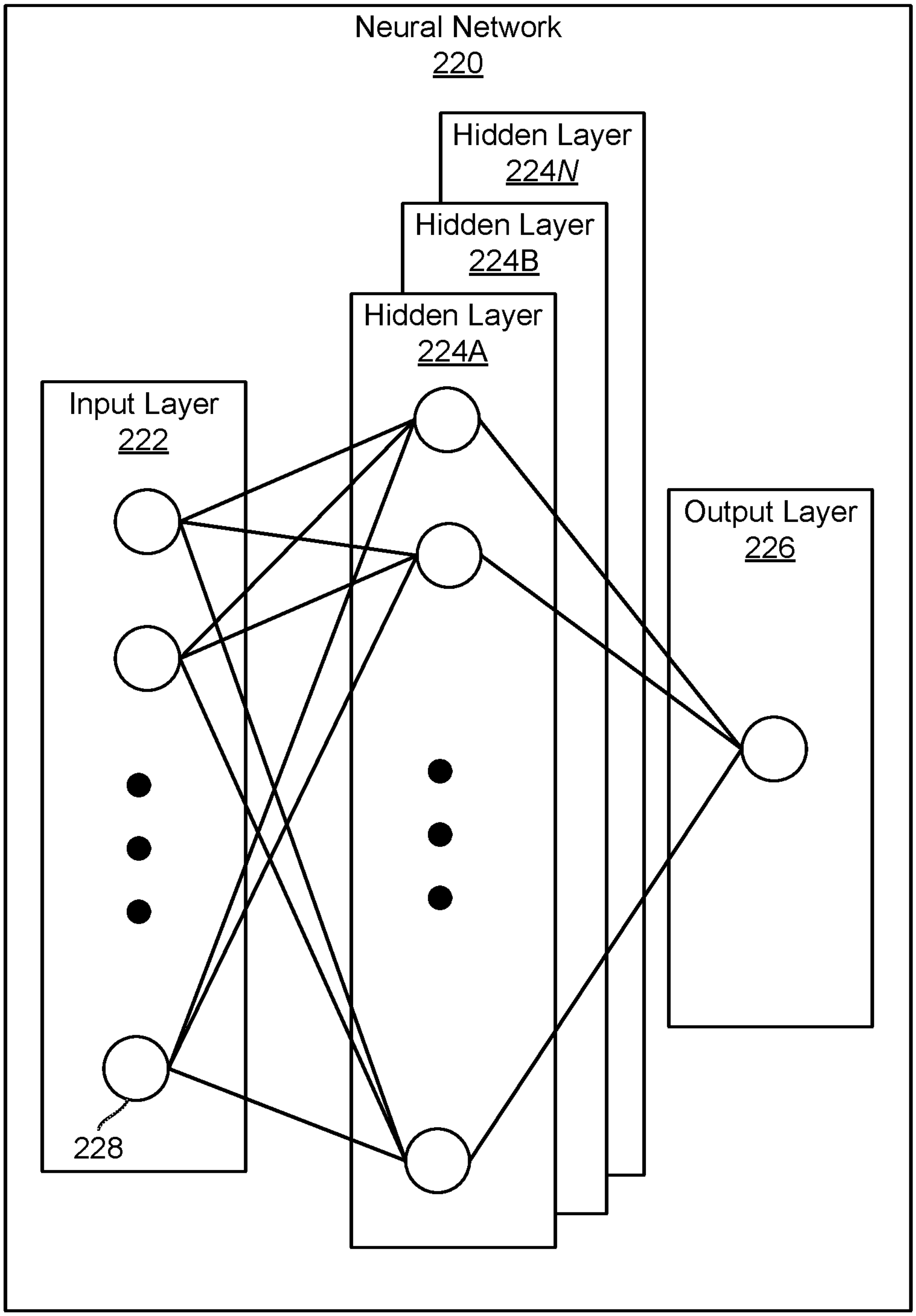
FIG. 1 is a diagram illustrating an example of a convolutional neural network, in accordance with some examples provided herein.

A deep neural network includes an input layer, multiple hidden layers, and an output layer. FIG. 1 is an illustrative example of a deep learning neural network 100. An input layer 120 includes input data. In one illustrative example, the input layer 120 can include data representing the pixels of an input video frame. The network 100 includes multiple hidden layers 122*a*, 122*b*, through 122*n*. The hidden layers 122*a*, 122*b*, through 122*n* include "n" number of hidden layers, where "n" is an integer greater than or equal to one. The number of hidden layers can be made to include as many layers as needed for the given application. The deep learning neural network 100 further includes an output layer 124 that provides an output resulting from the processing performed by the hidden layers 122*a*, 122*b*, through 122*n*. In one illustrative example, the output layer 124 can provide a classification and/or a localization for each object in an input video frame. The classification can include a class identifying the type of object (e.g., a person, a car, a dog, a cat, or other object for which the network 100 is trained to classify). When trained to localize an object, a localization output provided by the network 100 can include a bounding box indicating a location of an object.

The deep learning neural network 100 is a multi-layer neural network of interconnected nodes. Each node can represent a piece of information. Information associated with the nodes is shared among the different layers and each layer retains information as information is processed. In some cases, the deep learning neural network 100 can include a feed-forward network, in which case there are no feedback connections where outputs of the network are fed back into itself. In some cases, the network 100 can include a recurrent neural network, which can have loops that allow information to be carried across nodes while reading in input. In other cases, the network 100 can include any other type of neural network.

Information can be exchanged among nodes through node-to-node interconnections between the various layers. Nodes of the input layer 120 can activate a set of nodes in the first hidden layer 122*a*. For example, as shown, each of the input nodes of the input layer 120 is connected to each of the nodes of the first hidden layer 122*a*. The nodes of the hidden layers 122*a-n* can transform the data of each input node by applying filters (and in some cases other functions, such as pooling functions, non-linear activation functions, among others) to the data. In some cases, each hidden layer can include a number of channels of filters, such as a first channel including a first filter, a second channel including a second filter, and so on. In some cases, each channel can also include other functions, such as pooling functions, non-linear activation functions, among others. The data derived from the transformation can then be passed to and can activate the nodes of the next hidden layer 122*b*, which can perform their own designated functions. Example functions performed by the filters or other functions include convolutional, up-sampling, data transformation, and/or any other suitable functions. The output of the hidden layer 122*b* can then activate nodes of the next hidden layer, and so on. The output of the last hidden layer 122*n* can activate one or more nodes of the output layer 124 (or in some cases nodes of one or more fully connected layers), at which an output is provided. In some cases, while nodes (e.g., node 126) in the deep learning neural network 100 are shown as having multiple output lines, a node has a single output and all lines shown as being output from a node represent the same output value.

In some cases, each node or interconnection between nodes can have one or more tunable weights. Weights are a set of parameters derived from the training of the network 100. For example, an interconnection between nodes can represent a piece of information learned about the interconnected nodes. The interconnection can have a tunable weight that can be tuned (e.g., based on a training dataset), allowing the network 100 to be adaptive to inputs and able to learn as more and more data is processed. Each weight can include a numeric value.

The network 100 is pre-trained to process the features from the data in the input layer 120 using the different hidden layers 122*a*, 122*b*, through 122*n* in order to provide the output through the output layer 124. In an example in which the deep learning neural network 100 is used to identify objects in images, the network 100 can be trained using training data that includes both images and labels. For instance, training images can be input into the network, with each training image having a label indicating the classes of the one or more objects in each image (indicating to the network what the objects are and what features they have). In one illustrative example, a training image can include an image of a number 2, in which case the label for the image can be [0 0 1 0 0 0 0 0 0 0].

In some cases, the deep learning neural network 100 can adjust the weights of the nodes using a training process called backpropagation. Backpropagation can include a forward pass, a loss function, a backward pass, and a parameter (e.g., weight, bias, or other parameter) update. The forward pass, loss function, backward pass, and parameter update is performed for one training iteration. The process can be repeated for a certain number of iterations for each set of training images until the network 100 is trained well enough so that the weights (and/or other parameters) of the layers are accurately tuned.

For the example of identifying objects in images, the forward pass can include passing a training image through the network 100. The weights are initially randomized before the deep learning neural network 100 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 100 is unable to determine low level features and thus cannot make an accurate determination of what the classification of the object might be. A loss function can be used to analyze error in the output. Any suitable error function be used, such as a mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other error function. For instance, a MSE can be defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning neural network 100 can perform a backward pass by determining which inputs (weights) most contributed to the loss of the network, and can adjust the weights so that the loss decreases and is eventually minimized. For example, a derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For instance, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The network 100 can include any suitable deep network. One example includes a convolutional neural network (CNN), an autoencoder, a deep belief nets (DBNs), a Recurrent Neural Networks (RNNs), among others. For instance, the hidden layers of a CNN can include a series of hidden layers, such as one or more convolutional layers, one or more nonlinear layers (e.g., rectified linear unit (ReLU) layers), one or more pooling layers (for downsampling), and one or more fully connected layers.

Once the network 100 is trained, it can be used to provide an output related to a target task during inference (during run-time after the neural network model has been trained). An illustrative example of a target task that the network 100 can be trained to perform is a referring expressions task. The network 100 can be trained to perform other tasks, such as object detection, object classification, natural language processing, font selection, among others.

Figure 2:
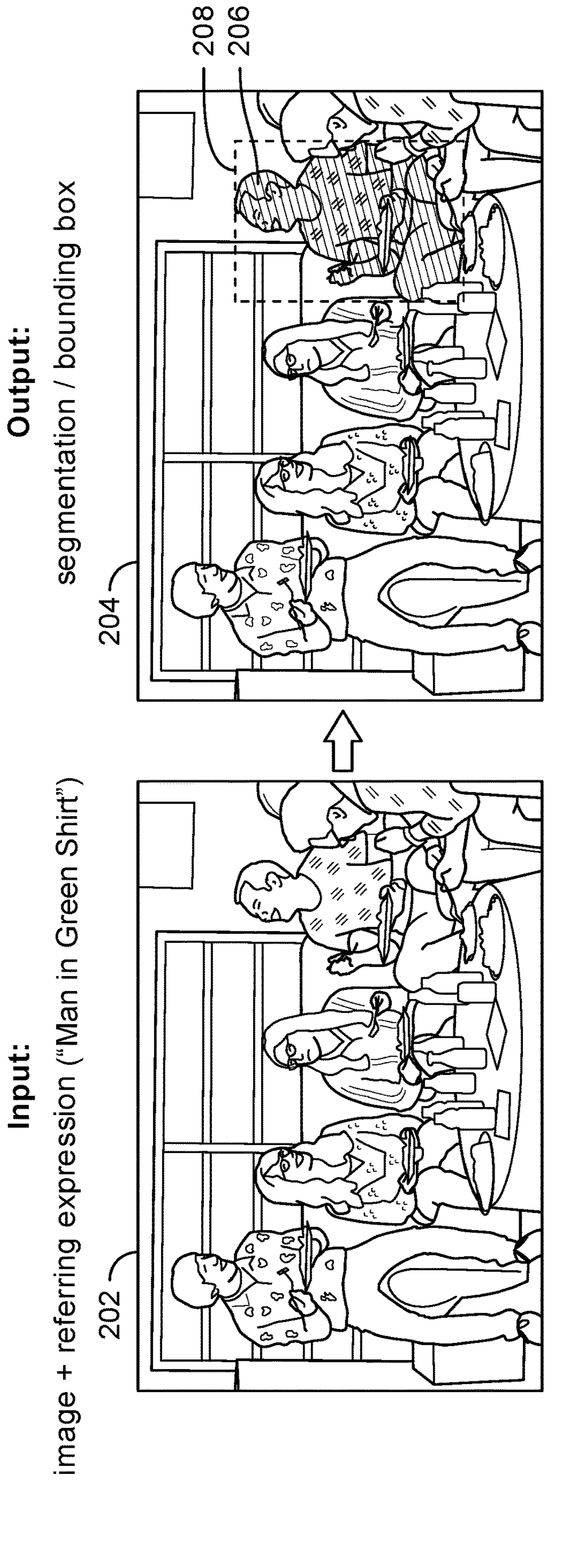
FIG. 2 are images illustrating an example of a referring expressions task that can be performed using a machine learning model, in accordance with some examples provided herein.

FIG. 2 is a diagram illustrating an example of a referring expressions task the network 100 can be trained to perform. A referring expression is a natural language phrase that describes a certain region in a given image. The region can correspond to an object, a feature, or other element described by the referring expression. With reference to FIG. 2, the input includes an image 202 and the referring expression "Man in Green Shirt." A goal of a referring expressions task is to provide an identification (e.g., a segmentation mask, a bounding box, or other identification) of the region described by the referring expression. The image 204 shows the output of the referring expressions task, where based on the referring expression "Man in Green Shirt," the man in the green shirt is identified by a segmentation mask 206 and a bounding box 208.

Deep neural networks have led to many state-of-the-art solutions for various tasks, including referring expressions, image recognition, object detection, among others. Despite the superior performance of deep neural networks, such networks can be over-parameterized in order to achieve good performance. The over-parameterization can result in a large amount of waste in computational resources. For example, a well-trained neural network can have many of the filters removed without affecting the performance of the target task. These findings suggest that deep neural networks trained with stochastic gradient descent can have unsatisfactory utilization of parameters. There is a need for techniques that can compress or prune neural networks more efficiently and more aggressively without introducing performances loss.

A machine learning model compression system and related methods (or processes) and computer-readable media are described herein that intelligently remove certain parameters of a machine learning model. The parameters are removed without introducing a loss in performance of the machine learning model for a given task. While the model compression techniques are described herein as being applied to a neural network as an example of a machine learning model, it will be understood that the model compression techniques described herein can be performed on other types of machine learning models.

Figure 3:
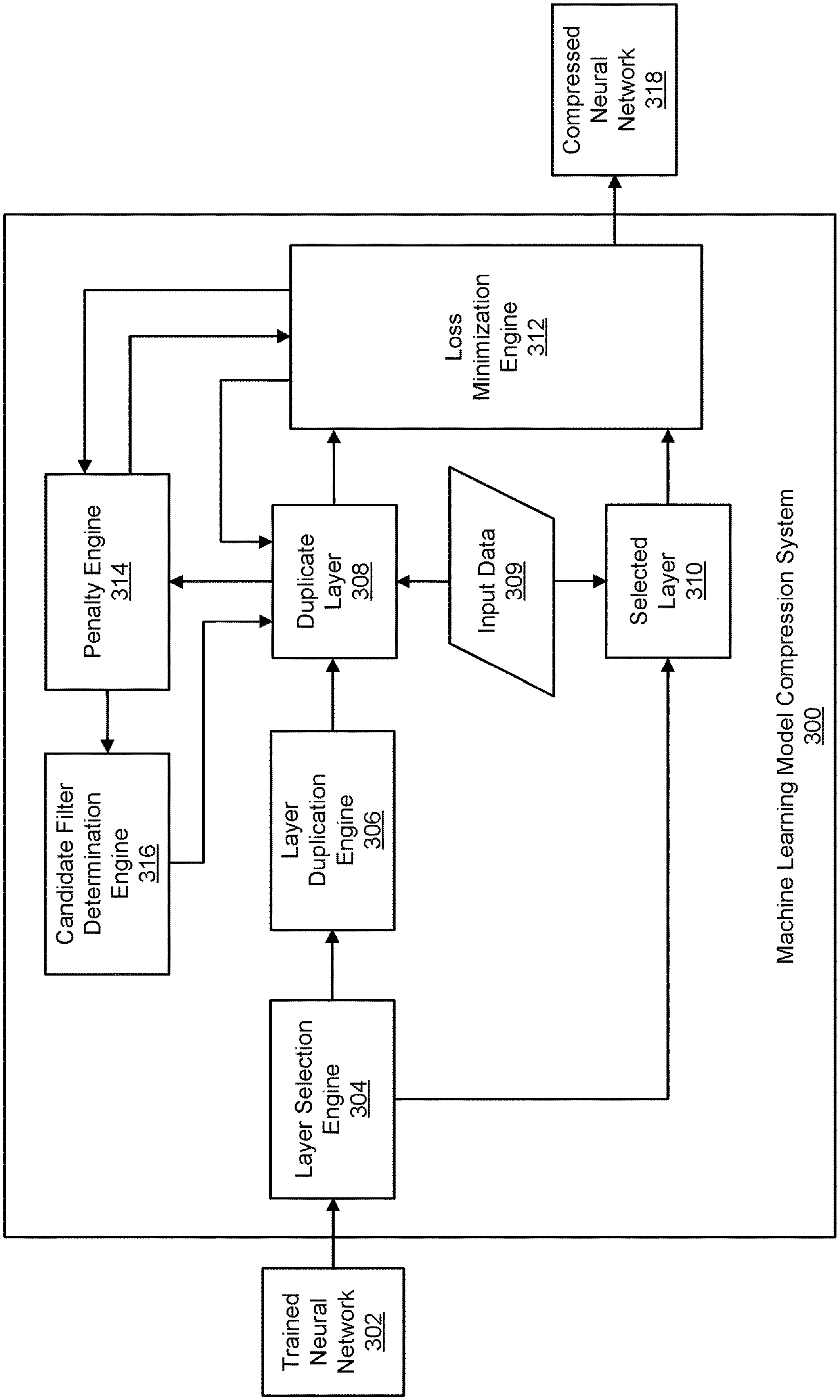
FIG. 3 is a block diagram illustrating an example of a machine learning model compression system, in accordance with some examples provided herein.

FIG. 3 is a block diagram illustrating an example of a machine learning model compression system 300 (also referred to as a model compression system 300). The model compression system 300 includes various components, including a layer selection engine 304, a layer duplication engine 306, a loss minimization engine 312, a penalty engine 314, and a candidate filter determination engine 316. The components of the model compression system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the model compression system 300 is shown to include certain components, one of ordinary skill will appreciate that the model compression system 300 can include more or fewer components than those shown in FIG. 3. For example, the model compression system 300 can also include, or can be part of a computing device that includes, an input device and an output device (not shown). In some implementations, the model compression system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the model compression system 300 can be implemented locally by and/or included in a computing device. For example, the computing device can include a mobile device, a personal computer, a tablet computer, a wearable device, a server (e.g., in a software as a service (SaaS) system or other server-based system), and/or any other computing device with the resource capabilities to perform the techniques described herein.

The model compression system 300 can be integrated with (e.g., integrated into the software, added as a plug-in, or otherwise integrated with) a software application, such as an image or photograph capture and/or editing application (e.g., Adobe Photoshop™, Adobe Lightroom™, among others), a social networking application (e.g., Instagram™, Facebook™ Pinterest™, Snapchat™, among others), a real estate application (e.g., Redfin™, Zillow™ among others), or any other application that incorporates the use of a machine learning model (e.g., a neural network). The software application can be a mobile application installed on a mobile device (e.g., a mobile phone, such as a smartphone, a tablet computer, a wearable device, or other mobile device), a desktop application installed on a desktop computer, or other software application.

The model compression system 300 receives as input a trained neural network 302. The trained neural network 302 can include a single-branch neural network or a multi-branch neural network. The model compression system 300 can compress a single-branch neural network or a multi-branch network. A single-branch neural network includes multiple hidden layers (similar to the neural network 100 of FIG. 1), with each layer of the single-branch neural network receiving the output from a previous layer. Each layer of the single-branch neural network includes a number of channels of filters (e.g., a first channel with a first filter, a second channel with a second filter, and so on). Each filter can be applied on a set of input data provided from a previous layer of the neural network. For instance, a filter can act as a detection filter for the presence of specific features or patterns present in the input data.

Figure 4:
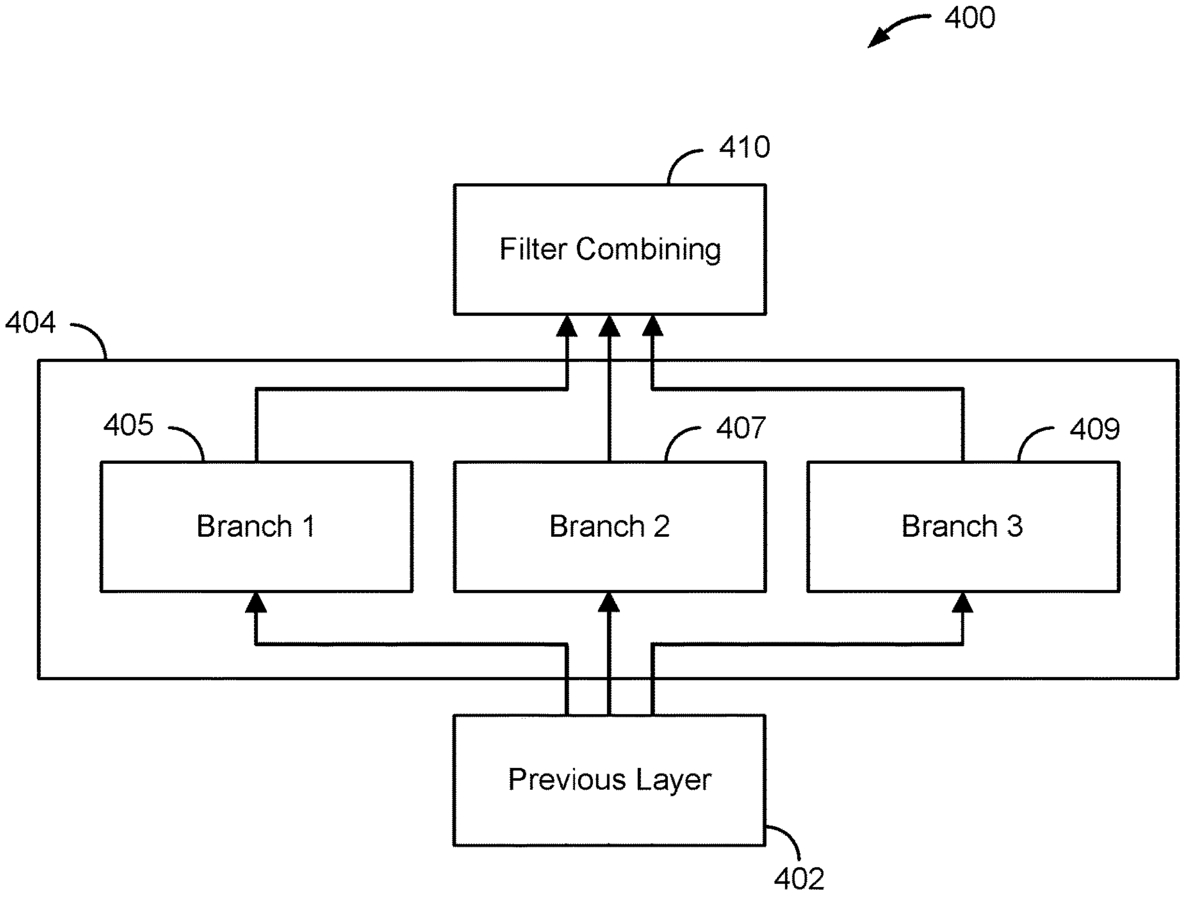
FIG. 4 is a diagram illustrating an example of a multi-branch neural network, in accordance with some examples provided herein.

In some cases, the trained neural network 302 can include a multi-branch neural network. Multi-branch architectures are common in many modern neural networks. FIG. 4 is a diagram illustrating an example of a part 400 of a multi-branch neural network, including a previous layer 402 and a current layer 404. The current layer 404 includes multiple parallel branches (including branch 405, branch 407, and branch 409). Each of the branches 405, 407, and 409 receive a previous output from the previous layer 402, and process the previous output to provide a current output. The current outputs of the branches 405, 407, and 409 are combined using a filter combining component 410. The filter combining component 410 can perform any suitable technique to combine the outputs from the branches 405, 407, and 409, such as summing, concatenating, or other operation used to combine the outputs of the parallel branches. The architecture of the part 400 of the multi-branch network shown in FIG. 4 is a three-branch neural network. However, a multi-branch neural network can include any number of branches.

The model compression system 300 can compress the trained neural network 302 in order to remove various parameters of the trained neural network 302. Parameters of the trained neural network 302 that can be removed based on the compression can include a channel and/or an entire branch of the trained neural network 302. For example, a filter included in a channel of a layer in the trained neural network 302 can be removed during the compression process if the filter meets certain criteria. As described in more detail below, the criteria can be based on a scaling factor associated with the filter. In some cases, weights of a filter in a channel of the trained neural network can be set to 0 based on the compression.

The layer selection engine 304 processes the trained neural network 302 to identify which layers or branches to consider for removal. The layer selection engine 304 can select or identify more complex layers or branches (referred to as complex layers or branches) that consume more resources than the other, less complex layers or branches (referred to as non-complex layers or branches). For example, the more complex layers or branches can be selected because they are more likely to have wasted resources (e.g., more weights than are needed to perform a given task) as compared to the less complex layers or branches. In some examples, the layer selection engine 304 can determine the complexity of a layer or branch based on a number of weights included in the layer or branch and/or based on the floating point operations (FLOPS) associated with the layer or branch. Any other suitable metric that is associated with the complexity of a layer or branch can be used. The complex layers or branches selected by the layer selection engine 304 can be further processed by the model compression system 300 for compression. The non-complex layers or branches that are not selected by the layer selection engine 304 are not modified by the model compression system 300.

Figure 5A:
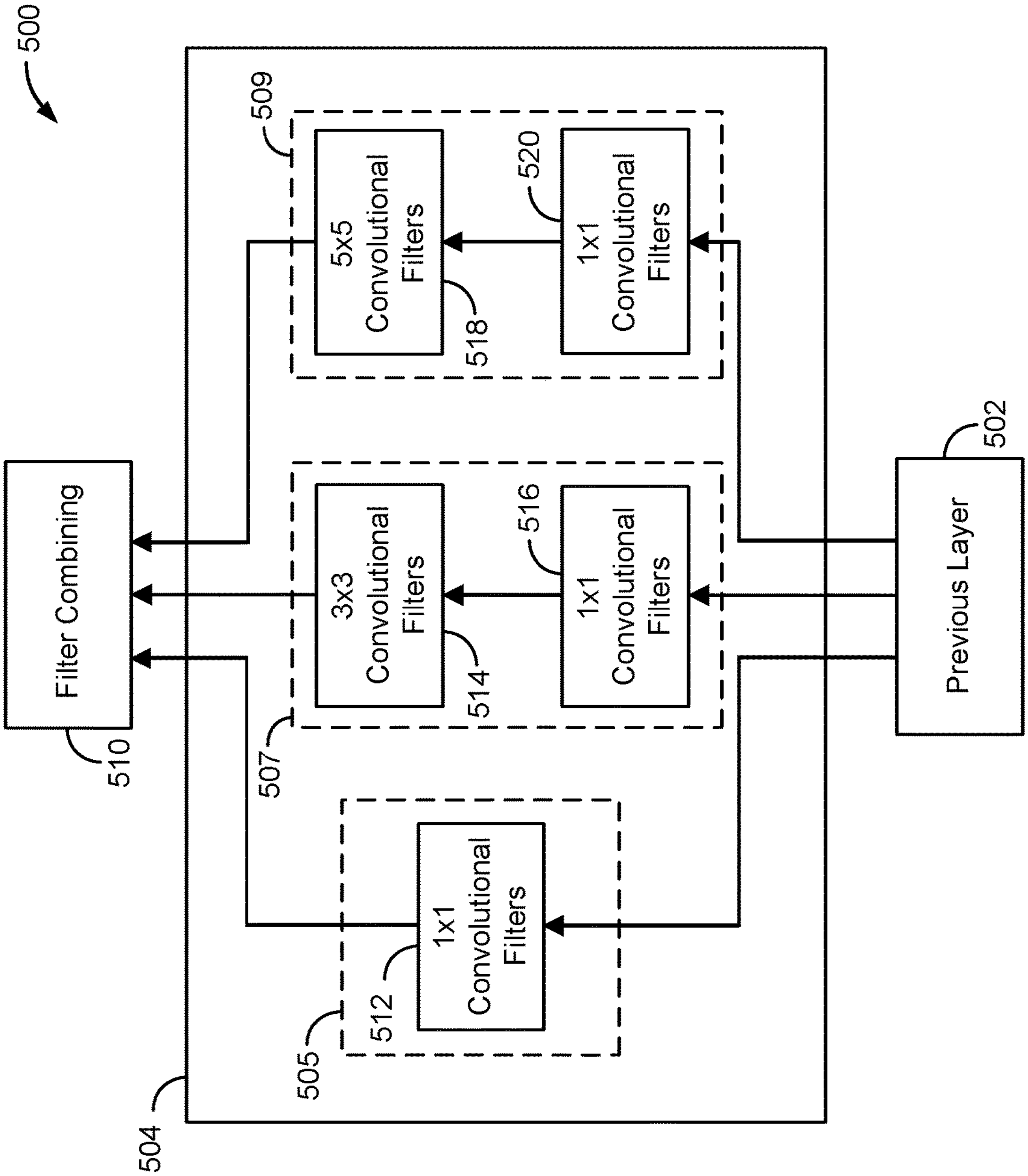
FIG. 5A is a diagram illustrating an example of a multi-branch neural network, in accordance with some examples provided herein.

Using a multi-branch network as an example, it can be assumed that the branches are imbalanced, in which case some branches consume more resources than the others, and thus are more likely to have wasted resources. For example, certain branches (complex branches) may have more weights than the other branches (non-complex branches). FIG. 5A is a diagram illustrating an example of a part 500 of a multi-branch neural network. Similar to FIG. 4, a previous layer 502 provides a previous output to a current layer 504. The current layer 504 includes a branch 505, a branch 507, and a branch 509. The branch 505 includes one or more 1×1 convolutional filters 512, such a first 1×1 convolutional filter in a first channel, a second 1×1 convolutional filter in a second channel, through an $n^{th}$ 1×1 convolutional filter in an $n^{th}$ channel, where n is any positive integer value. The branch 507 includes one or more 3×3 convolutional filters 514 over a number of channels, and one or more 1×1 convolutional filters 516 over a number of channels. The branch 509 includes one or more 5×5 convolutional filters 518 over a number of channels, and one or more 1×1 convolutional filters 520 over a number of channels.

Each of the convolutional filters includes a certain number of tunable weights, which are tuned during training. For example, a 1×1 filter will include a single weight, a 3×3 filter will include nine weights, and a 5×5 filter will include twenty-five weights. The previous output from the previous layer 502 can include an array of values (referred to as an input array). Each of the convolutional filters (e.g., the one or more 1×1 convolutional filters 512, the one or more 1×1 convolutional filters 516, and the one or more 1×1 convolutional filters 520) can be convolved around the input array according to a stride associated with each of the convolutional filters. The stride is the number of values the filter will be shifted over the input array at each convolutional iteration of the filter. A stride of one indicates that a filter will be moved one value at a time, a stride of two indicates that the filter will be moved two values at a time, and so on.

In one illustrative example, at a first convolutional iteration, the weight values of a convolutional filter are multiplied with a corresponding number of the values of the input array (e.g., a 1×1 convolutional filter array is multiplied by a 1×1 array of input values starting at a top-left corner of the input array). For a next convolutional iteration, the filter can be moved to a next location in the input array according to the stride (e.g., moved to the right by a value of one for a stride equal to one). Processing the filter at each unique location of the input array produces a number representing the filter results for that location or convolutional iteration. For example, at each iteration, the multiplications of the input array values with the values from the convolutional filter can be summed together to obtain a total sum value for that iteration. An output array of values for the convolutional filter can be produced, with each value of the output array corresponding to the number representing the filter results for that location or iteration.

Figure 5B:
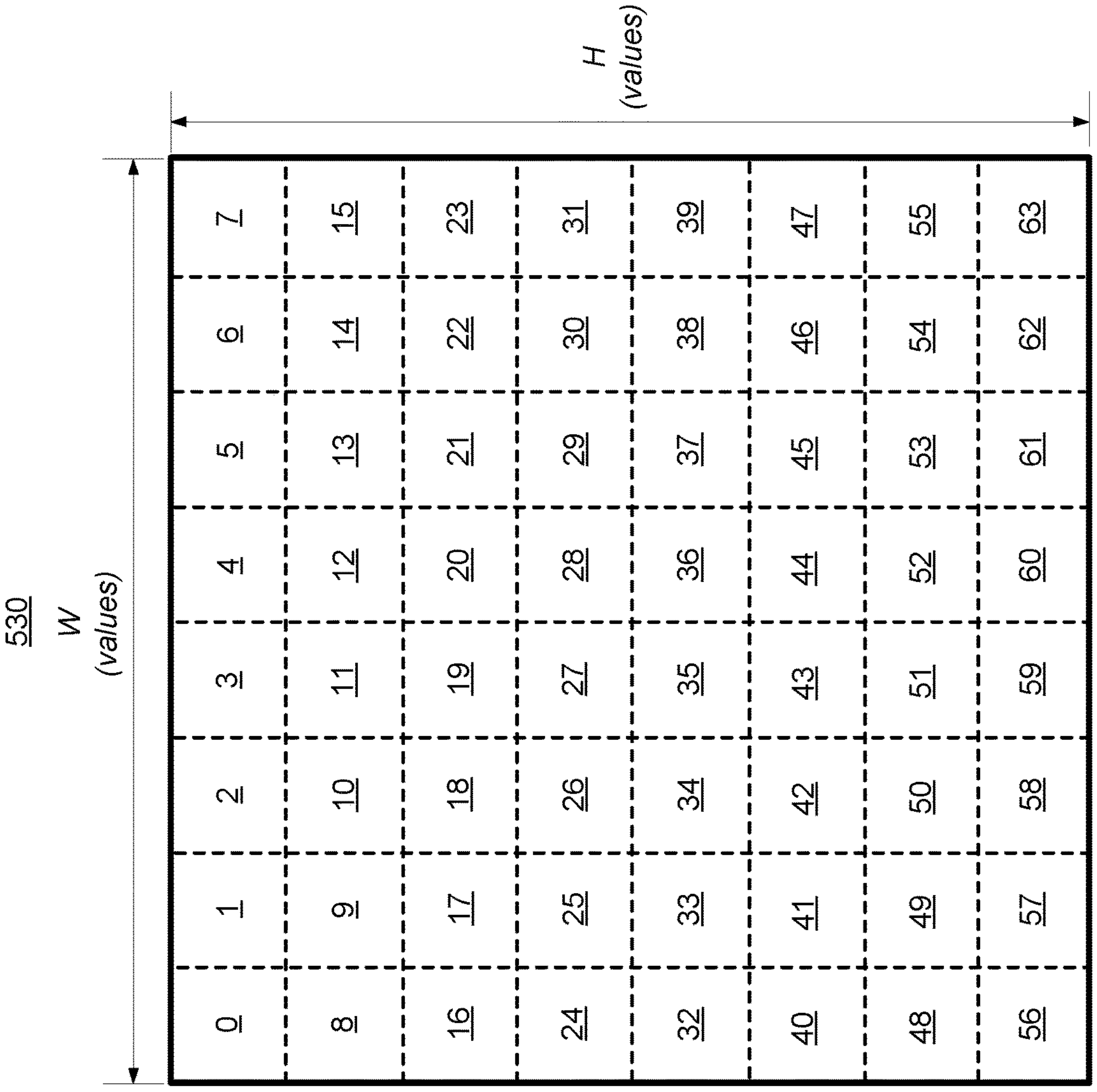
FIG. 5B is a diagram illustrating an example of an input array of values, in accordance with some examples.
Figure 5C:
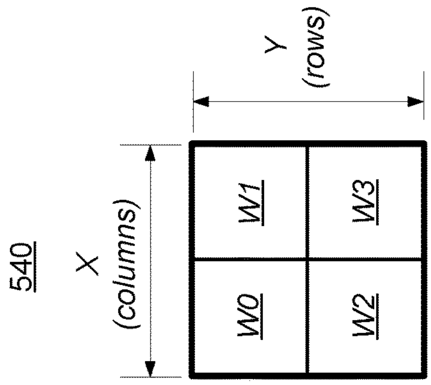
FIG. 5C is a diagram illustrating an example of a 2×2 convolutional filter, in accordance with some examples.

FIG. 5B illustrates an example of an input array 530. The input array 530 includes an W×H array of values, wherein W and H are integer values. The value of W and the value of H can be equal or can be different values. In the example shown in FIG. 5B, the value of W is equal to 8, and the value of H is equal to 8, making the input array 530 an 8×8 array of values. The values of the input array 530 are sequentially numbered from 0 to 63. FIG. 5C illustrates an example of an X×Y convolutional filter 540. The X×Y convolutional filter 540 illustrated in FIG. 5C has an X-value of 2 and a Y-value of 2, making the convolutional filter 540 a 2×2 filter with weights w0, w1, w2, and w3. The convolutional filter 540 has a stride of two.

Figure 5E:
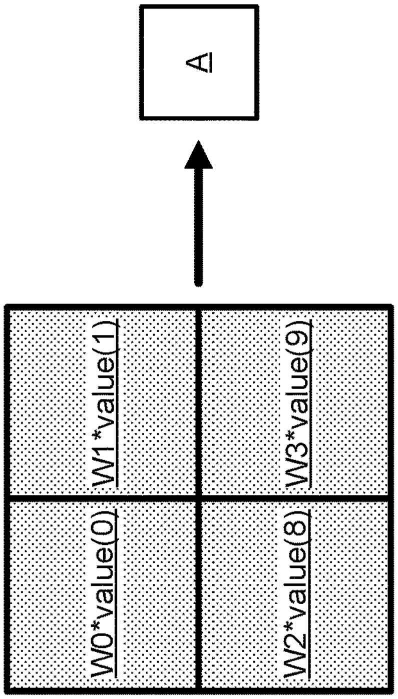
FIG. 5D-FIG. 5G are diagrams illustrating an example of application of the 2×2 convolutional filter to the input array of values, in accordance with some examples.
Figure 5D:
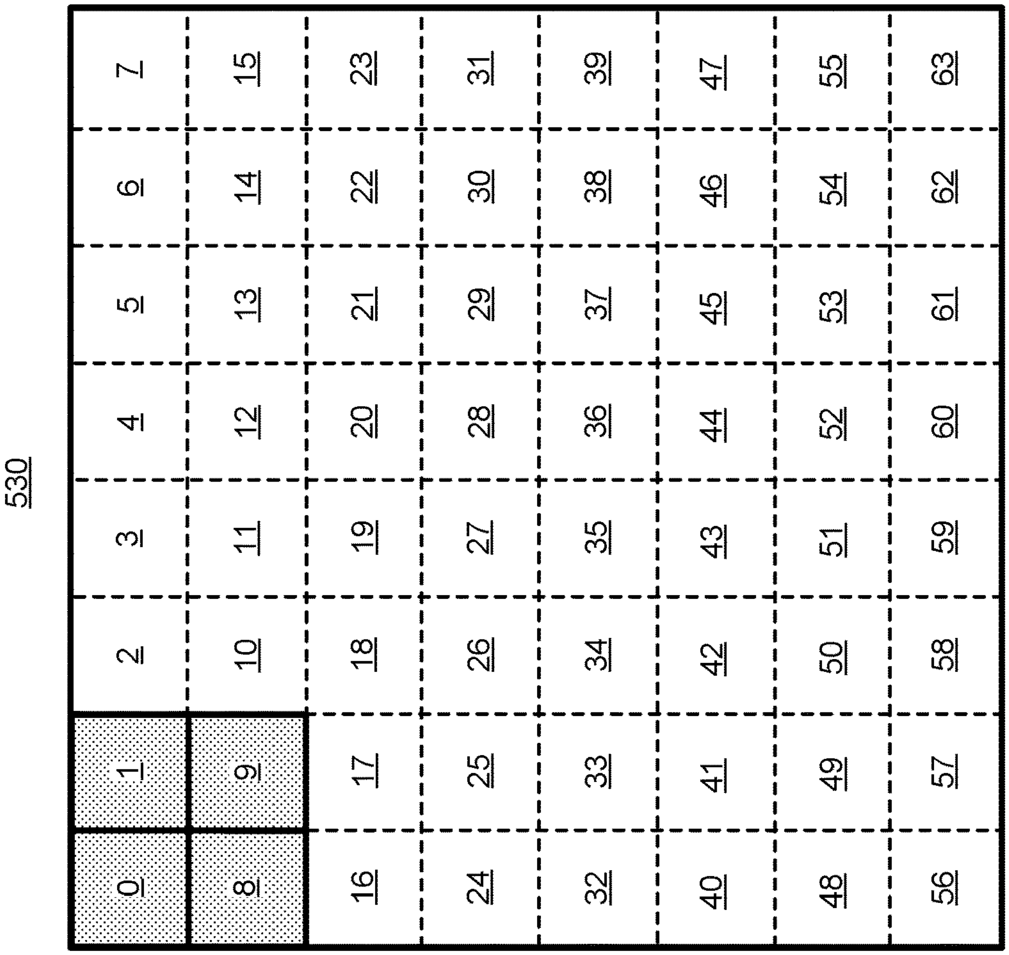

FIG. 5D-FIG. 5G are diagrams illustrating an example of application of the 2×2 filter 540 to the input array 530. As shown in FIG. 5D, the convolutional filter 540 is first applied to the top-left most values of the input array 530. For example, the weights w0, w1, w2, and w3 of the convolutional filter 540 are applied to the values at locations 0, 1, 8, and 9 of the input array 530. As shown in FIG. 5E, the weight w0 is multiplied by the value of value at location 0, the weight w1 is multiplied by the value at location 1, the weight w2 is multiplied by the value at location 8, and the weight w3 is multiplied by the value at location 9. The values (shown as W0*value(0), W1*value(1), W2*value(8), W3*value(9)) resulting from the multiplications can then be summed together (or otherwise combined) to generate an output A for that node or iteration of the convolutional filter 540.

Figure 5G:
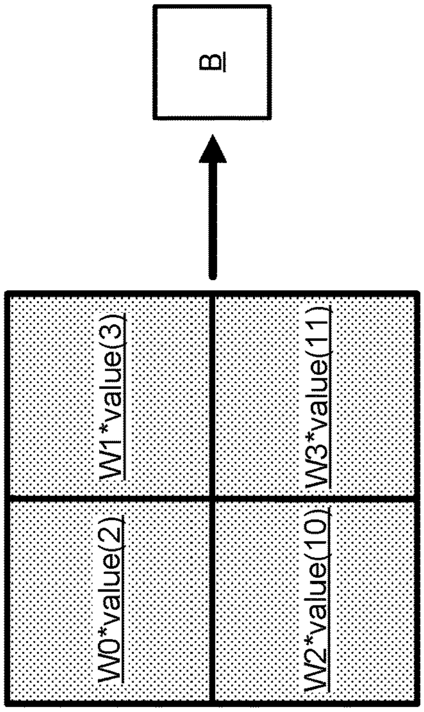
Figure 5F:
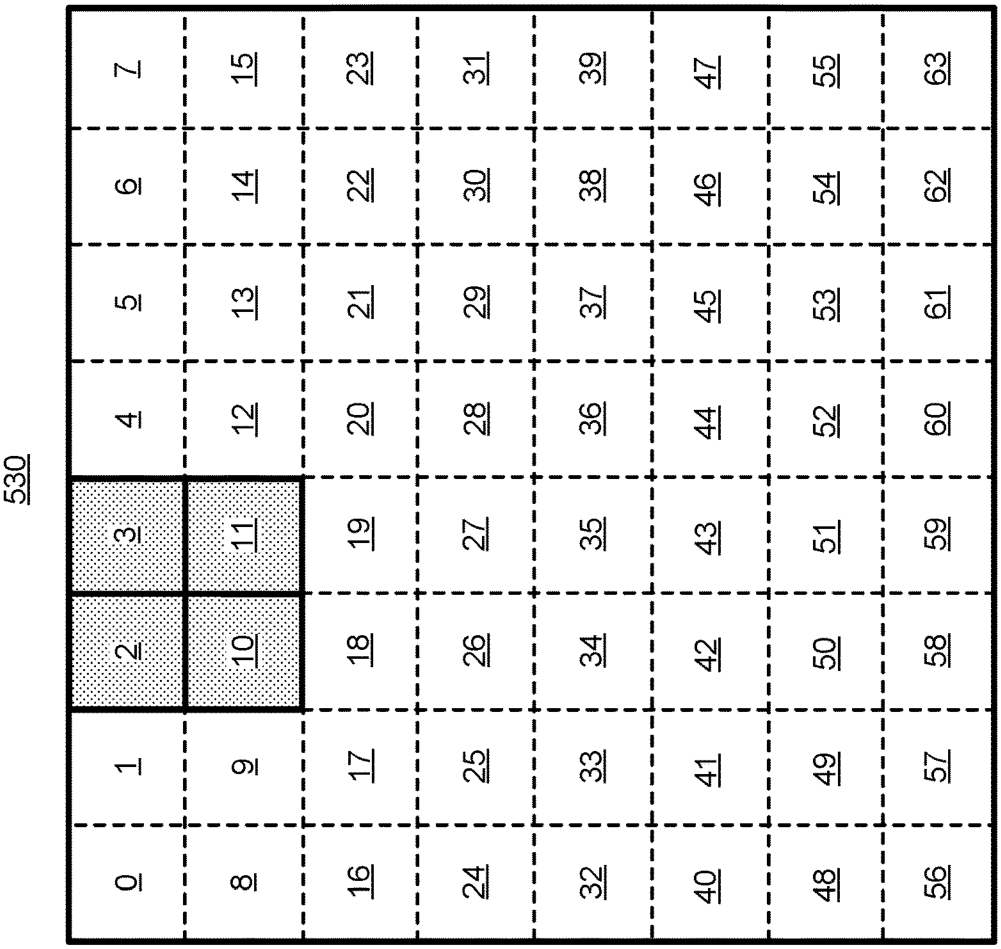
Figure 5H:
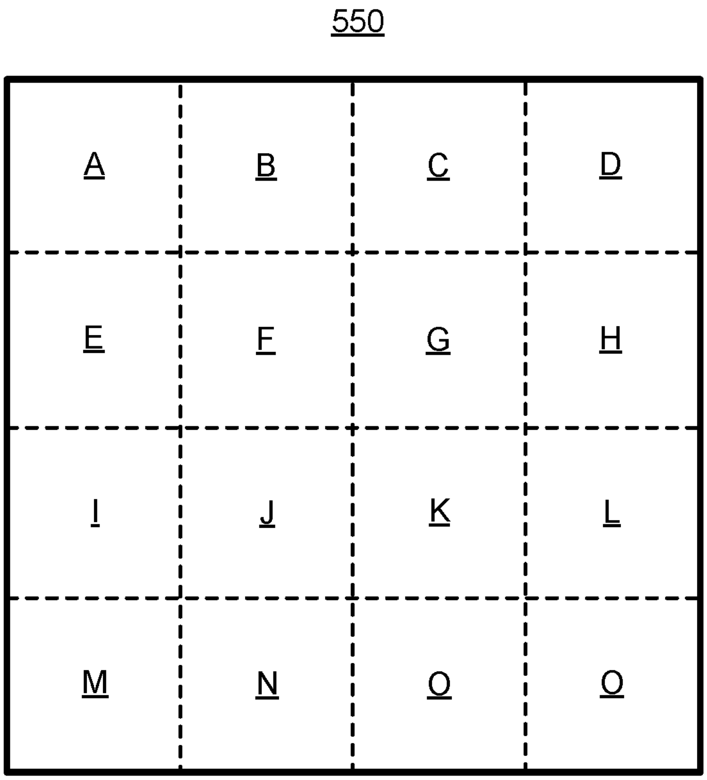
FIG. 5H is a diagram illustrating an output (or feature map) resulting from application of the 2×2 filter to the input array of values, in accordance with some examples.

For a next iteration of convolutional filter 540, the filtering process is continued at a next location of the input array 530 by moving the convolutional filter 540 by the stride amount of 2 to the next receptive field, as shown in FIG. 5F. Because the stride is set to 2, the convolutional filter 540 is moved to the right by two values, as shown in FIG. 5F. When moved to the right by two values, the weights w0, w1, w2, and w3 of the convolutional filter 540 are applied to the values at locations 2, 3, 10, and 11 of the input array 530. For example, as shown in FIG. 5G, the weight w0 is multiplied by the value at location 2, the weight w1 is multiplied by the value at location 3, weight w2 is multiplied by the value at location 10, and the weight w3 is multiplied by the value at location 11. The values (shown as W0*value(2), W1*value (3), W2*value(10), W3*value(11)) resulting from the multiplications can then be summed together (or otherwise combined) to generate an output B for that node or iteration of the convolutional filter 540. A similar process can be applied until the convolutional filter 540 has been convolved around the entire input array 530. FIG. 5H shows a feature map 550 resulting from the convolutional filter 540 being applied to the input array 530. The feature map 550 includes the total sum values A through O resulting from each iteration of the convolutional filter 540 on the values of the input array 530.

As noted above, each of the convolutional filters includes a certain number of tunable weights. As the number of channels of each layer or branch increases, the number of weights grows accordingly. Referring to FIG. 5, each of the branches 505, 507, and 509 can have a same number of channels. The branch 509 will have more weights than the branch 507 and the branch 505, due in part to the 5×5 convolutional filters 518 being larger (and thus including more weights) than the 3×3 convolutional filters 514 of the branch 507 and the 1×1 convolutional filters 512 of the branch 505.

A weight threshold can be set for each branch. If the number of weights in a branch (or layer, such as in a single-branch neural network) is greater than the weight threshold, the branch can be selected (or identified) for compression by the model compression system 300. In one illustrative example, referring to FIG. 5A, the weight threshold can be set to a value of 35. Assuming the number of channels of each of the branches 505, 507, and 509 is three channels, the branch 505 will have three total weights (based on three channels each having a 1×1 filter with one weight), the branch 507 will have 30 total weights (nine weights for each of the 3×3 convolutional filters in each of the three channels, and one weight for each of the 1×1 convolutional filters in each of the three channels), and the branch 509 will have 78 total weights (25 weights for each of the 5×5 convolutional filters in each of the three channels, and one weight for each of the 1×1 convolutional filters in each of the three channels). The number of weights of the branch 509 (78 weights) is greater than the weight threshold of 35 and can be considered as a complex branch, while the branch 505 and the branch 507 can be considered as non-complex branches because the numbers of weights for those branches are below the weight threshold. Because the number of weights of the branch 509 is greater than the weight threshold, the layer selection engine 304 can select the branch 509 for compression. When compressing a multi-branch network, the complex branches are compressed, and the non-complex branches are maintained as-is (in which case the non-complex branches are not compressed).

As noted above, the number of FLOPs and/or other metric can be used to identify complex layers or branches for compression in addition to or as an alternative to the number of weights. For example, a FLOP threshold can be set for a neural network, and if the number of FLOPs of a layer or branch exceeds the FLOP threshold, the layer selection engine 304 can select that layer or branch for compression. The FLOP threshold can be set to any suitable value (e.g., a percentage or a number between 0 and 1), such as 0.70 (or 70%), 0.75 (or 75%), 0.80 (or 80%), or other suitable value. The FLOP threshold can be a percentage of the FLOPs that a particular branch or layer consumes relative to the FLOPs of the entire neural network. In one illustrative example using 80% (or 0.80) as the FLOP threshold, if a branch takes more than 80% of the FLOPs of the whole model, then the branch can be considered as a complex branch.

As described in more detail below, once the complex layers or branches of the trained neural network 302 are selected for compression by the layer selection engine 304, the penalty engine 314 applies a penalty to filters of the selected complex layers or branches. In some cases, the penalty can be based on a scaling factor associated with a layer or branch. The penalty is used to determine which filters are candidate filters that will be removed (or have weights that are removed) from a layer or branch, and can encourage the sparsity of the non-removable filters so more filters are identified as removable. Adding the same penalty to all the filters of a neural network, without considering the characteristics (e.g., weights, FLOPs, etc.) of the filters can be sufficient for detecting candidate filters for removal when the neural network has balanced resource allocation on all layers or branches. However, for neural networks with imbalanced layers or branches (e.g., ResNet, which is a multi-branch network with imbalanced branches), having the same level of penalty applied to all the layers or branches can negatively affect the non-complex layers or branches and can thus diminish the final performance of the network. For example, removing filters from the non-complex layers or branches can diminish the quality of the output of those layers or branches, because there are likely fewer wasted resources in the non-complex layers or branches.

By selecting only the complex layers or branches for compression using the techniques described above, the penalty is applied by the penalty engine 314 to the complex layers or branches and is not applied to the non-complex layers or branches, which can preserve the parameters of the non-complex layers or branches. Such selective compression provides better resource savings because the complex layers or branches have many more resources (and thus are likely to have more wasted resources that do not add to the quality of the output) as compared to the non-complex layers or branches.

The candidate filters can be determined and removed from the complex layers or branches of the trained neural network 302 in a way that preserves the local features of the trained neural network 302, ensuring that the compressed versions of the complex layers or branches output features that are similar to the features output from the original (uncompressed) layers or branches. Using a layer including a set of filters (over one or multiple channels) as an example, the local features of the set of filters can be preserved by generating a copy of the set of filters (referred to as a duplicate set of filters), and using the original set of filters as supervision (e.g., by keeping the original set of filters fixed) as the duplicate set of filters are updated and as one or more candidate filters are removed from the duplicate set of filters. For example, as described below, the loss minimization engine 312 can minimize a loss function (e.g., including an error function, such as mean squared error, and the penalty applied by the penalty engine 314) to maintain the outputs of the original set of filters as weights, scaling factors, and/or other parameters of the duplicate filters are updated and as the candidate filters or parameters (e.g., weights) of the candidate filters are removed from the duplicate set of filters.

Referring to FIG. 3, the layer selection engine 304 can provide the selected complex layers or branches to the layer duplication engine 306. The layer duplication engine 306 can generate a duplicate layer or branch for each of the complex layers or branches selected by the layer selection engine 304. For example, a duplicate layer 308 can be generated for a selected layer 310. While only one duplicate layer 308 and one selected layer 310 are shown in FIG. 3 for illustrative purposes, it will be understood that any number of layers (or branches) can be selected and that duplicate layers (or branches) can be generated for the number of selected layers (or branches). The duplicate layer 308 can include the same set of filters that are in the selected layer 310. For instance, to generate the duplicate layer 308, the layer duplication engine 306 can identify a set of filters in the selected layer 310, and can generate a duplicate set of filters that match the identified set of filters. The duplicate set of filters can include an exact copy of the set of filters, including the same dimensions (e.g., 1×1, 3×3, 5×5, or other dimension) and the same weight values and/or other parameters (e.g., scaling factors, biases, etc.).

As noted above, the original set of filters of a selected layer or branch can be used for supervision (e.g., by keeping the original set of filters fixed) as parameters of one or more of the duplicate filters are updated and/or as one or more candidate filters are removed from the duplicate set of filters. For instance, input data 309 can be input to a selected layer or branch (and thus the original set of filters), such as the selected layer 310, and also to the duplicate layer or branch (and thus the duplicate set of filters), such as the duplicate layer 308. In some examples, the input data 309 can include the training data that was used to train the trained neural network 302. In some examples, the input data 309 can include other data, such as a subset of the training data, the training data plus other data, data that is completely different than the training data, or other data. The set of filters of the selected layer 310 can process the input data 309 and can generate outputs. The duplicate set of filters of the duplicate layer 308 can also process the input data 309 and can generate outputs. In one illustrative example, a filter of the selected layer 310 and a duplicate filter (generated as a copy of the filter of the selected layer 310) of the duplicate layer 308 can include the 2×2 convolutional filter 540 of FIG. 5C, which can generate the activation map 550 as an output based on application of the 2×2 convolutional filter 540 to the input array 530.

The output from the set of filters of the selected layer 310 and the output from the duplicate set of filters of the duplicate layer 308 can be provided to the loss minimization engine 312. The loss minimization engine 312 can minimize a loss function that includes an error between the output of the set of filters of the selected layer 310 and the output of the duplicate set of filters of the duplicate layer 308 as well as the penalty applied by the penalty engine 314. In some examples, the error can be based on an error function, which can include a mean squared error (MSE) function or other function (e.g., a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other error function). One illustrative example of a loss function that can be used by the loss minimization engine 312 is described below with respect to Equation (3).

During the minimization of the loss function by the loss minimization engine 312, the original set of filters from the selected layer 310 remains fixed. For example, the weights of the original set of filters remain fixed, and none of the filters from the original set of filters are removed. By fixing the output of the original set of filters, the original set of filters act as a supervision label for training the parameters of the duplicate set of filters of the duplicate layer 308. At each iteration of the loss function during minimization, the candidate filters determined by the candidate filter determination engine 316 (based on the penalty applied by the penalty engine 314) are removed from the duplicate set of filters. Also at each iteration of the loss function, the weights and scaling factors of the remaining filters of the duplicate set of filters (after the candidate filters are removed) are updated so that the output of the remaining filters match the output of the original set of filters. By keeping the original set of filters fixed during minimization of the loss function, the output of the duplicate set of filters is encouraged to match the output of the set of filters, even as filters are updated and candidate filters are removed from the duplicate set of filters.

As noted above, the penalty engine 314 can apply a penalty to the duplicate set of filters. The candidate filter determination engine 316 can select candidate filters for removal from the duplicate set of filters depending on the penalty applied by the penalty engine 314. In some cases, the penalty can be based on one or more scaling factors of the duplicate set of filters. A scaling factor can be denoted by the scale parameter $\gamma$ (e.g., as used in batch normalization layers), which can be used to detect the candidate filters. For example, batch normalization can be part of the neural network architecture, and can be used to perform normalization for each training mini-batch (e.g., by fixing the means and variances of the inputs of each layer or branch). A mini-batch can include a subset of the training data set having a size of N. Batch normalization can allow the use of higher learning rates and can act as a regularizer, in some cases eliminating the need for dropout (where certain neurons are ignored during training). A batch normalization layer can use the following equation to normalize the outputs of the convolutional layer before it:

$$\hat{z} = \frac{z_{in} - \mu_H}{\sqrt{\sigma_H^2 + \epsilon}};\ z_{out} = \gamma\hat{z} + \beta, \qquad \text{Equation (1)}$$

where $\hat{z}$ is the normalized output, $z_{in}$ is the output of the prior convolutional layer, $\mu_H$ is the mean of the activations (or outputs) of the mini-batch H, $$\sigma_H^2$$

is the variance of the activations (or outputs) of the mini-batch H, $\gamma$ is the scaling factor of a channel (and corresponding filter), and $\beta$ is a shift parameter. The scaling factor $\gamma$ is a learnable parameter that can be learned (updated) as the loss is minimized by the loss minimization engine 312. The scaling factor $\gamma$ can be used to allow a neural network to preserve the network capacity. The scaling factor $\gamma$ can also be used to represent an importance of a particular channel the scaling factor is associated with. Equation (1) above is the scaling factor $\gamma$ times the normalized output values $\hat{z}$ (from the previous layer) plus the shifting parameter $\beta$. During training, backpropagation can be performed to compute the gradients with respect to the normalized output values $\hat{z}$ and also with respect to the scaling factor $\gamma$. Using the gradients of the scaling factors $\gamma$, a gradient descent method can be used as an optimization method to tune the values of the scaling factors $\gamma$.

The candidate filter determination engine 316 can determine that a filter (and corresponding channel) is a candidate filter (or removable filter) if the scaling factor $\gamma$ of the filter is less than a scaling factor threshold. In some cases, the scaling factor threshold can be set to a percentage of a scaling factor representative of the batch normalization layer (e.g., a maximal scaling factor, an average scaling factor, or other representative scaling factor). In one illustrative example, the scaling factor threshold can be set to a percentage of the maximal scaling factor (denoted as $\gamma_{max}$) in the same batch normalization layer, and any filter with a scaling factor below the scaling factor threshold can be identified as a candidate filter for removal from the candidate set of filters. Such an illustrative example can be denoted as $\gamma<t\cdot\gamma_{max}$, where $\gamma_{max}$ is the maximal $\gamma$ in the same batch normalization layer. The threshold t can be set to any suitable value, such as 1%, 2%, or other value. After a period of learning time, the scaling factor $\gamma$ of some of the filters in the duplicate set of filters will become smaller than the scaling factor threshold, and will be identified as candidate filters by the candidate filter determination engine 316.

As previously described, the local features of the original set of filters of a selected layer 310 (or branch) can be preserved by using the original set of filters for supervision as a duplicate set of filters are updated and as one or more candidate filters are removed from the duplicate set of filters. In some cases, the following loss function (including a regularizer g(γ)) can be used to determine candidate filters for removal and to encourage the sparsity of the non-removable filters (the filters not selected as candidate filters):

$$L = \sum_{(x,y)} l(f(x, W), y) + \lambda \sum_{\gamma \in T} g(\gamma), \quad \text{Equation (2)}$$

where (x, y) represents the input training samples in the dataset (e.g., the training input and target or labels), the first term l(f(x,W),y) is the training loss function (the parameter W representing the training weights) used to normally train the neural network without model compression, and g(γ) is a sparsity-induced penalty (e.g., an L1 regularizer) applied on all the scaling factors γ with a hyper-parameter A that controls a tradeoff between the loss and the sparsity of γ. The parameter T represents the entire set of scaling factor γ values.

The l(f(x,W),y) training loss includes all layers or branches of a neural network, including the complex layers or branches and the non-complex layers or branches of the neural network, in which case the penalty g(γ) is applied to the complex layers or branches and the non-complex layers or branches. As described above, adding the same penalty to all the layers or branches of a neural network that has imbalanced layers or branches can negatively affect the non-complex layers or branches and can thus diminish the final performance of the network because the non-complex layers likely have less wasted resources (and thus less resources, such as filters or weights, that can be removed without affected performance) as compared to the complex layers.

Instead of using the l(f(x,W),y) training loss that also includes the non-complex branches (in which case the penalty is applied to the non-complex branches), the supervision in the loss function denoted by Equation (3) below can be used to maintain the outputs of only the complex branches. The term B denotes an original complex layer or branch of interest selected by the layer selection engine 304. A copy of B can be generated by the layer duplication engine 306, where the copy (or duplicate) of B is denoted as B*. The original complex layer or branch B includes a set of filters, and the B* (the duplicate of B) includes a duplicate set of filters. As noted above, the duplicate set of filters in B* can include an exact copy of the original set of filters in B (e.g., including the same dimensions, the same weight values, the same scaling factors, and/or other parameters). The candidate (or removable) filters in the duplicate set of filters in B* can be determined by minimizing (or optimizing) the following loss function:

$$L^*(B, B^*) = \frac{1}{N}\sum_{(x=1)}^{N} |B(x) - B^*(x)|^2 + \lambda \sum_{\gamma \in T} g(\gamma), \quad \text{Equation (3)}$$

where N denotes the mini-batch size (or the input of the entire network in some cases), B(x) denotes the output of the complex layer or branch B taking the training samples x (in the mini-batch or for the entire network) as input, B*(x) denotes the output of the duplicate layer or branch B* taking the training samples x as input. When minimizing the loss, the input x is input through only the branch or layer being compressed. The term g(γ) is a sparsity-induced penalty applied on all the scaling factors γ with a hyper-parameter A being used to balance the first and second terms of Equation (3). The hyper-parameter A can be set to any suitable value, such as 1e-4, 2e-4, 3e-4, or other value. The parameter T represents the entire set of scaling factor γ values. In some cases, the term g(γ) can be set to an L1-norm or L1 regularizer denoted as g(γ)=|•|, which can be used to achieve sparsity of the non-removable filters (the filters not selected as candidate filters) so that more filters in the duplicate set of filters can be identified as candidate filters for removal. Subgradient descent can be used as an optimization method for the L1-norm penalty term. In some examples, the L1-norm penalty can be replaced with a smooth-L1 penalty to avoid using the sub-gradient decent method.

The first term $$\left(\frac{1}{N}\sum_{(x=1)}^{N} |B(x) - B^*(x)|^2\right)$$

in Equation (3) is a mean squared error (MSE) function that retains the local features of the original layer or branch B (the outputs of the original set of filters in B). In some cases, error functions other than MSE can be used. The second term ($\lambda\Sigma_{\gamma\in T}g(\gamma)$) in Equation (3) represents the penalty that is added to all the filters in B*, so that more filters can be identified as candidate filters. For example, because the scaling factors γ of the filters in B* are being minimized, the scaling factors γ of some of the filters in B* are encouraged to have smaller values, resulting in certain filters in B* being determined as candidate filters if the scaling factors of those filters are below the scaling factor threshold. For example, as noted above, the term g(γ) can be set to an L-norm or L regularizer, and minimizing the L1-norm or L1 regularizer function (e.g., g(γ)=|•|) encourages the scaling factor values to be smaller. Accordingly, minimizing the loss function L*(B,B*) of Equation (3) results in removal of the candidate filters from B* while preserving the outputs of the original set of filters in B. The outputs of the original set of filters in B are preserved by keeping the filters in B fixed during minimizing of the loss function L*(B,B*), in which case the filters are not removed from B and the parameters of B (e.g., weights, scaling factors, etc. of the filters in B) are not updated at each iteration of minimizing the loss function. Maintaining the original set of filters fixed during minimization of the loss function L*(B,B*) encourages the output of the duplicate set of filters to match the output of the set of filters, even as filters are updated and candidate filters are removed from the duplicate set of filters.

After a first iteration of minimizing the loss function L*(B,B*), the first term $$\left(\frac{1}{N}\sum_{(x=1)}^{N} |B(x) - B^*(x)|^2\right)$$

in Equation (3) will be zero or a very small value due to B* being a copy of B. After the first iteration, minimization of the second term ($\Delta\Sigma_{\gamma\in T}g(\gamma)$) in Equation (3) will result in some of the filters in B* being removed, and thus the B* will no longer be a copy of B in subsequent iterations of minimizing the loss function. For example, in a second iteration, there will be a difference in the B(x) and the B*(x) values because B and B* will not provide the same output due to removal of the candidate filters from B*, resulting in an error between B(x) and B*(x). The loss minimization engine 312 will minimize the error while encouraging the output B*(x) to match the output B(x) using equation (3), thus preserving the local features of B.

After removing the removable filters in B* by minimizing Equation (3), the layer or branch B is replaced in the trained neural network 302 with the compressed layer or branch B*. Based on the loss minimization described above, the compressed layer or branch B* will provide a similar output as the original layer or branch B, but will have fewer parameters (e.g., channels, branches, weights, etc.) and thus require less computational resources. Once all layers and/or branches of the trained neural network 302 are processed for compression, the model compression system 300 outputs a compressed neural network 318 that includes one or more compressed layers or branches (e.g., B*).

In some examples, after removing the removable filters in B* and replacing the layer or branch B in the trained neural network 302 with the compressed layer or branch B*, the entire compressed neural network 318 can be fine-tuned by re-training the compressed neural network 318 using the training data and the training loss that was used to train the trained neural network 302. During fine-tuning, only the parameters (e.g., weights and/or other parameters) in the compressed layers or branches (e.g., B*) will be adjusted, in which case the parameters of the original layers or branches (e.g., B) will remain fixed and not be modified. For example, backpropagation can be performed including one or more iterations of a forward pass, a loss function to determine a loss between the output and the ground truth labels, a backward pass, and a parameter update to update the weights, biases, scaling parameters, and/or other parameters of the compressed layers or branches. The backpropagation process can be repeated for a certain number of iterations for each set of training data until the compressed neural network 318 is trained well enough so that the weights (and/or other parameters) of the layers are accurately tuned.

Because minimization of the loss (e.g., using Equation (3)) encourages the compressed layers or branches (e.g., B*) to output results that are similar to the outputs of the original layers or branches (e.g., B), and because the fine-tuning process uses the original training loss, the final network with the compressed layers or branches (e.g., B* in replacement of B) will have less filters than the original layers or branches (e.g., B), while maintaining the performance of the original layers or branches (e.g., B).

Figure 6:
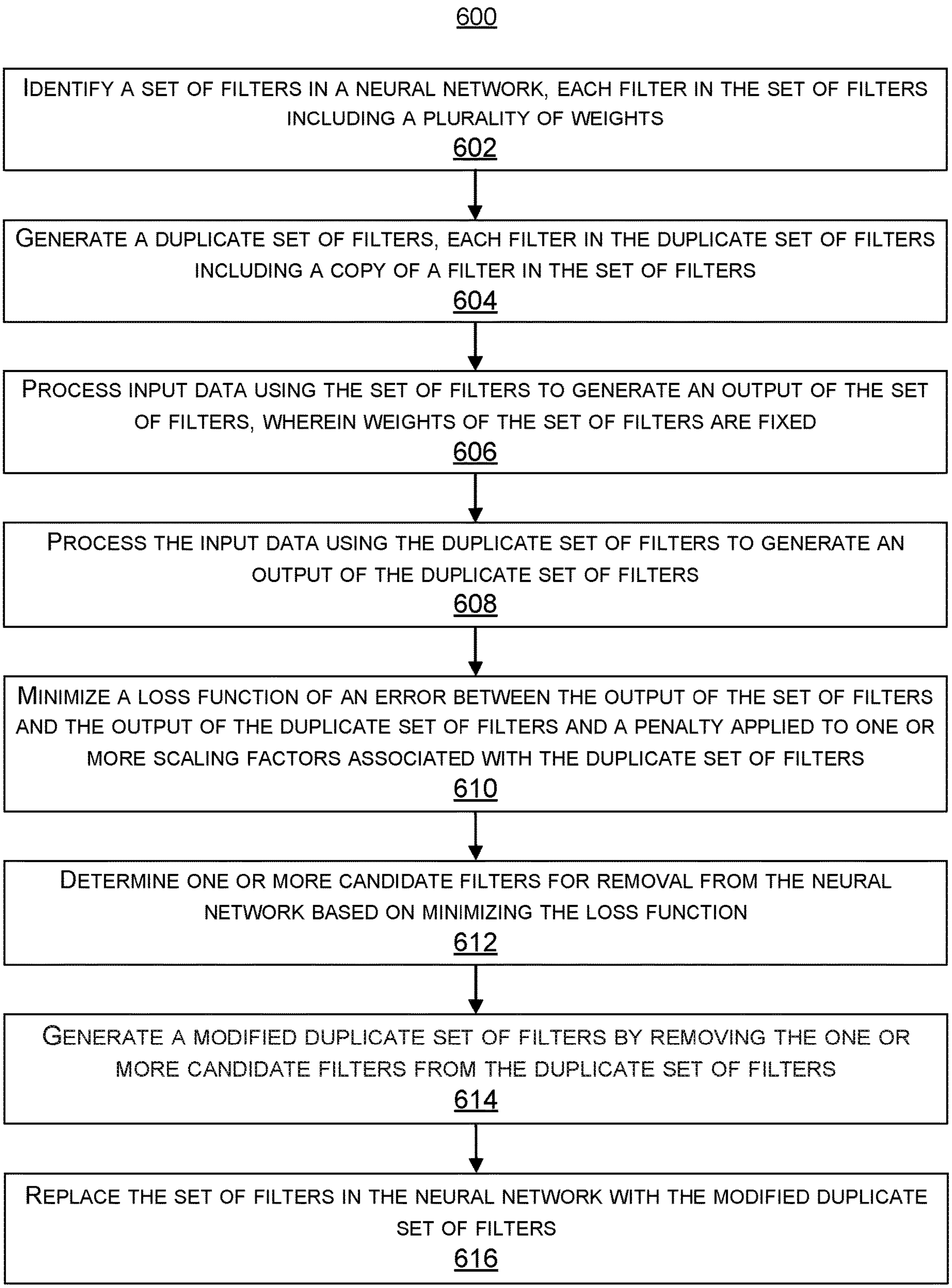
FIG. 6 is a flowchart illustrating an example of a process of processing one or more images, in accordance with some examples provided herein.

An example of a process performed using the techniques described herein will now be described. FIG. 6 is a flowchart illustrating an example of a process 600 for processing one or more images. At block 602, the process 600 includes identifying a set of filters in a neural network. Each filter in the set of filters includes a plurality of weights. The neural network is trained using a set of training data prior to identifying the set of filters from the neural network. In one illustrative example, the neural network is the trained neural network 302 of FIG. 3.

In some examples, the neural network can include a single-branch neural network. In such examples, the set of filters include filters of a layer (or multiple layers in some cases) of the single-branch neural network. In some examples, the neural network can include multi-branch neural network including a plurality of branches. Each branch can include at least one layer. In such examples, the set of filters include filters of a branch of the multi-branch neural network.

In some examples, the set of filters can be identified based on a determination that the set of filters are included in a complex layer or branch. For example, the set of filters can be identified (e.g., by the layer selection engine 304) from a plurality of filters in the neural network based on at least one of a number of weights associated with the set of filters being higher than a weight threshold and a number of floating point operations (FLOPS) associated with the set of filters being higher than a FLOP threshold. For example, a number of weights of a layer or branch including the set of filters can be determined to be above a weight threshold, and can be identified as a complex layer or branch that will be analyzed for potential compression. In some examples, at least one filter from the plurality of filters in the neural network are excluded from the set of filters based on at least one of a number of weights associated with the at least one filter being lower than the weight threshold and a number of floating point operations (FLOPS) associated with the at least one filter being less than the FLOP threshold. For example, another layer or branch of the neural network can have a number of weights and/or FLOPS that is lower than the threshold, and thus can be determined to be a non-complex layer or branch. As described above, non-complex layers or branches are left as-is and are not compressed.

At block 604, the process 600 includes generating a duplicate set of filters. Each filter in the duplicate set of filters includes a copy of a filter in the set of filters. For example, as described above, the layer duplication engine 308 can generate a copy of a complex layer or branch (e.g., the duplicate layer or branch B*), which includes a copy of the set of filters from the complex layer.

At block 606, the process 600 includes processing input data using the set of filters to generate an output of the set of filters. The weights of the set of filters are fixed as the input data is processed by the set of filters, which as described above, helps to preserve the local features of the original set of filters. At block 608, the process 600 includes processing the input data using the duplicate set of filters to generate an output of the duplicate set of filters.

At block 610, the process 600 includes minimizing a loss function of an error between the output of the set of filters and the output of the duplicate set of filters and a penalty applied to one or more scaling factors associated with the duplicate set of filters. In some examples, the error between the output of the set of filters and the output of the duplicate set of filters includes a mean squared error (e.g., as used in Equation (3)). Other error functions can also be used, such as a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other error function.

In some examples, the process 600 can include minimizing the loss function by iteratively determining the error between the output of the set of filters and the output of the duplicate set of filters and the penalty applied to the one or more scaling factors associated with the duplicate set of filters. For example, as described above with reference to Equation (3), various iterations of the loss function can be performed in order to minimize (or optimize) the loss function.

At block 612, the process 600 includes determining one or more candidate filters for removal from the neural network based on minimizing the loss function. In some examples, the one or more candidate filters are determined based on a scaling factor of the one or more candidate filters having a value less than a scaling factor threshold. For example, as described above, the penalty applied to the one or more scaling factors can encourage the one or more scaling factors to have smaller values. Filters that have scaling factors that are below the scaling factor threshold can be determined to be candidate filters that will be removed from the neural network.

At block 614, the process 600 includes generating a modified duplicate set of filters by removing the one or more candidate filters from the duplicate set of filters. For example, after the candidate filters are removed from B* based on the minimization of the loss function, a compressed version of B* is output. At block 616, the process 600 includes replacing the set of filters in the neural network with the modified duplicate set of filters (e.g., B is replaced with the compressed version of B*). In some examples, the process 600 includes re-training the modified duplicate set of filters using the set of training data (and in some cases the training loss) that was used to train the neural network. Re-training the neural network using the training data (and the training loss in some cases) re-tunes the network so that it can complete the target task the network was designed to perform with high accuracy.

In some examples, the process 600 may be performed by a computing device or apparatus, such as a computing device having the computing device architecture 1100 shown in FIG. 11. In one example, the process 600 can be performed by a computing device with the computing device architecture 900 implementing the model compression system 300 shown in FIG. 3. In some cases, the computing device or apparatus may include an input device, a layer selection engine, a layer duplication engine, a loss minimization engine, a penalty engine, a candidate filter determination engine, an output device, one or more processors, one or more microprocessors, one or more microcomputers, and/or other component(s) that is/are configured to carry out the steps of process 600. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 600 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7A:
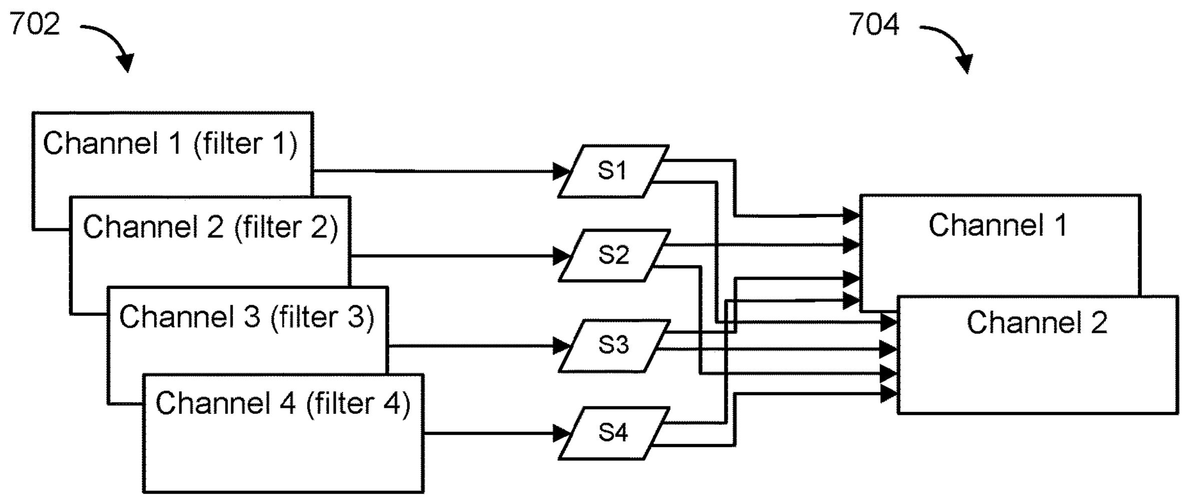
FIG. 7A is a diagram illustrating an example of a branch of a multi-branch neural network, in accordance with some examples provided herein.
Figure 7B:
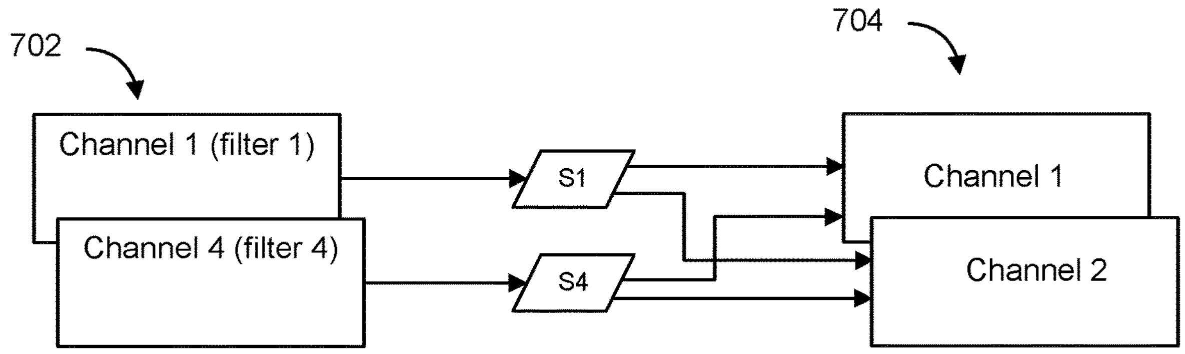
FIG. 7B is a diagram illustrating an example of a compressed branch of a multi-branch neural network, in accordance with some examples provided herein.

FIG. 7A and FIG. 7B are diagrams illustrating removal of channels of a convolutional layer 702 of a neural network based on scaling factor values associated with filters of the channels. As shown in FIG. 7A, the convolutional layer 702 has four channels, include channel 1, channel 2, channel 3, and channel 4. Channel 1 can include a first filter (filter 1), channel 2 can include a second filter (filter 2), channel 3 can include a third filter (filter 3), and channel 4 can include a fourth filter (filter 4). Channel 1 has a first scaling factor S1, channel 2 has a second scaling factor S2, channel 3 has a third scaling factor S3, and channel 4 has a fourth scaling factor S4. If left uncompressed, the outputs from each of the channels 1-4 of the layer 702 are provided to each of a first channel (channel 1) and a second channel (channel 2) of a next layer 704 of the neural network.

Using the techniques described above, the penalty engine 314 can apply a penalty to the channels of the layer 702 based on minimization of the loss by the loss minimization engine 312 (e.g., using Equation (3)). The candidate filter determination engine 316 can determine if any of the channels should be removed based on the penalty. For example, as shown in FIG. 7B, the penalty applied by the penalty engine 314 during minimization of the loss can result in the scaling factor S2 of channel 2 and the scaling factor S3 of channel 3 being minimized to a value below the scaling factor threshold. The candidate filter determination engine 316 can determine that the channels 2 and 3 include candidate filters, and can remove the candidate filters (and thus the channels) from the neural network, as shown in FIG. 7B. The outputs from channel 1 and channel 2 of the layer 702 are provided to each of channel 1 and channel 2 of the next layer 704 of the neural network.

Figure 8:
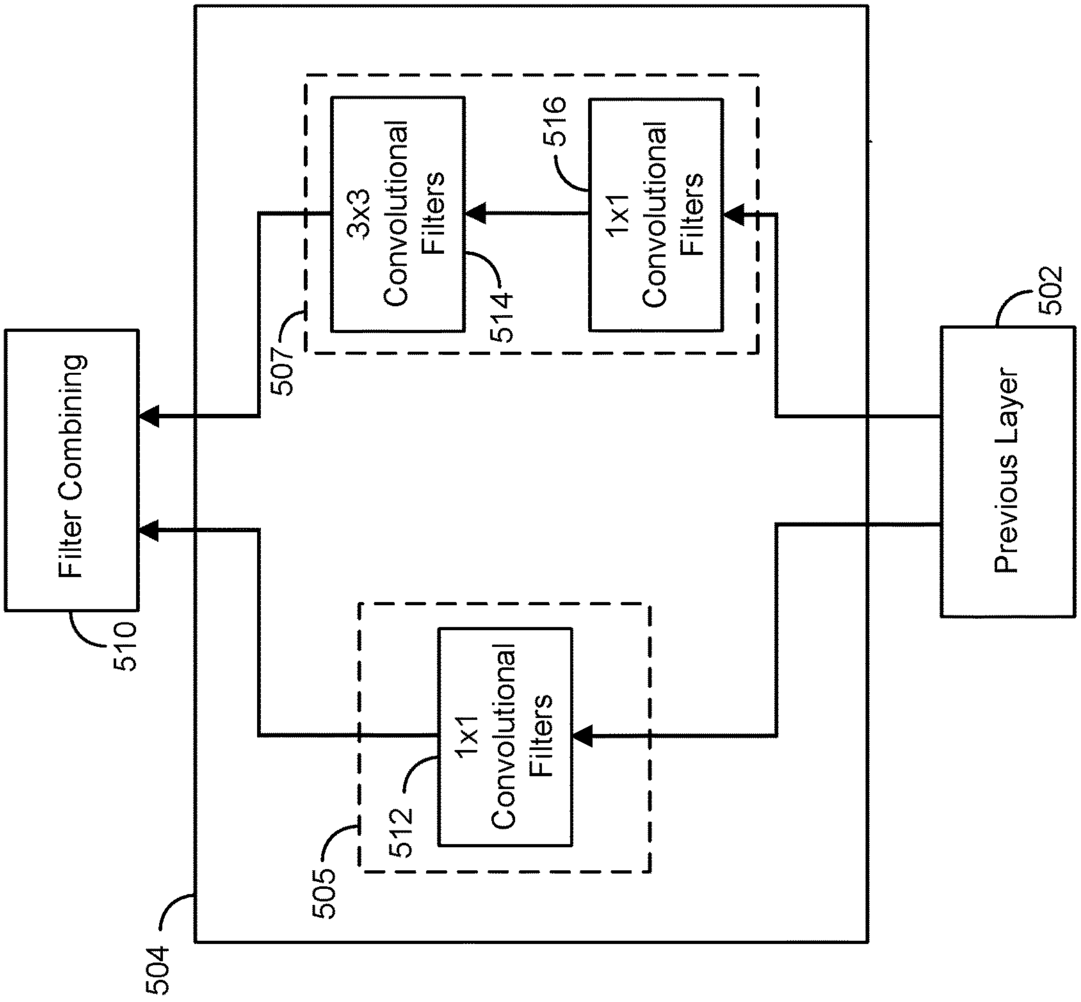
FIG. 8 is a diagram illustrating an example of a compressed multi-branch neural network, in accordance with some examples provided herein.

FIG. 8 is a diagram illustrating an example a compressed neural network 800, which is a compressed version of the multi-branch neural network 500 of FIG. 5A. As shown in FIG. 8, a current layer 504 of the compressed neural network 800 includes the branch 505 and the branch 507, but not the branch 509. As described above with respect to FIG. 5A, the branch 509 was identified as a complex branch based on the branch 509 having a number of weights (78 weights) greater than the weight threshold (e.g., 35). Based on minimization of a loss function by the loss minimization engine 312 and a penalty applied by the penalty engine 314 (e.g., using Equation (3)), candidate filter determination engine 316 can remove the entire branch 509, including the 5×5 convolutional filters 518 and the 1×1 convolutional filters 520. In some examples, only a subset of all of the filters of the branch 509 can be removed (e.g., resulting in B*), such as one or more channels of filters included in the branch 509. In such examples, the branch 509 would still be present in the compressed neural network 800, but with less parameters.

Using the model compression system 300 and the related techniques described herein, parameters of a neural network can be greatly reduced, without affecting the performance of the neural network. In one example, by implementing the techniques described herein, 80% of the parameters of a trained neural network can be removed without affecting the performance of on a challenging dense prediction task. For instance, an image segmentation experiment can be performed using a neural network model composed from a complex network branch, a non-complex (light-weighted) branch, and a densenet network branch that uses the concatenation of the complex network branch and the non-complex shortcut to output a final binary dense prediction.

In the experiment, pruning of channels in the complex branch is performed using the techniques described herein to generate a compressed model. Table 1 below shows the performance comparison between the full model and the compressed model. As shown, the full model with 10.22 million parameters is compressed by a factor of five (5×) to 2.05 million parameters without affecting the performance of the network.

TABLE 1

Mean Intersection over Union (mIoU) reported on different test datasets for the base model and the pruned model.

| Dataset | Full Model (10.22M) | Compressed Model (2.05M) |
|---|---|---|
| DUT-Omron | 0.8340 | 0.8428 |
| Adobe Flickr-hp | 0.9300 | 0.9297 |
| Adobe Flickr-portrait | 0.9690 | 0.9671 |
| MSRA10K | 0.8700 | 0.8738 |
| COCO-person | 0.9080 | 0.9026 |

The results shown in Table 1 are shown as a mean Intersection over Union (mIoU) metric. The IoU is the ratio between the area of overlap and the area of union between the ground truth and the predicted areas, and can be used as a metric in object detection to evaluate the relevance of the predicted locations. The mIoU is the average between the IoU of the segmented objects over all the images of the test dataset. As shown, even after pruning using the techniques described herein, the mIoU values after the model is compressed are similar to the full model.

Figure 9:
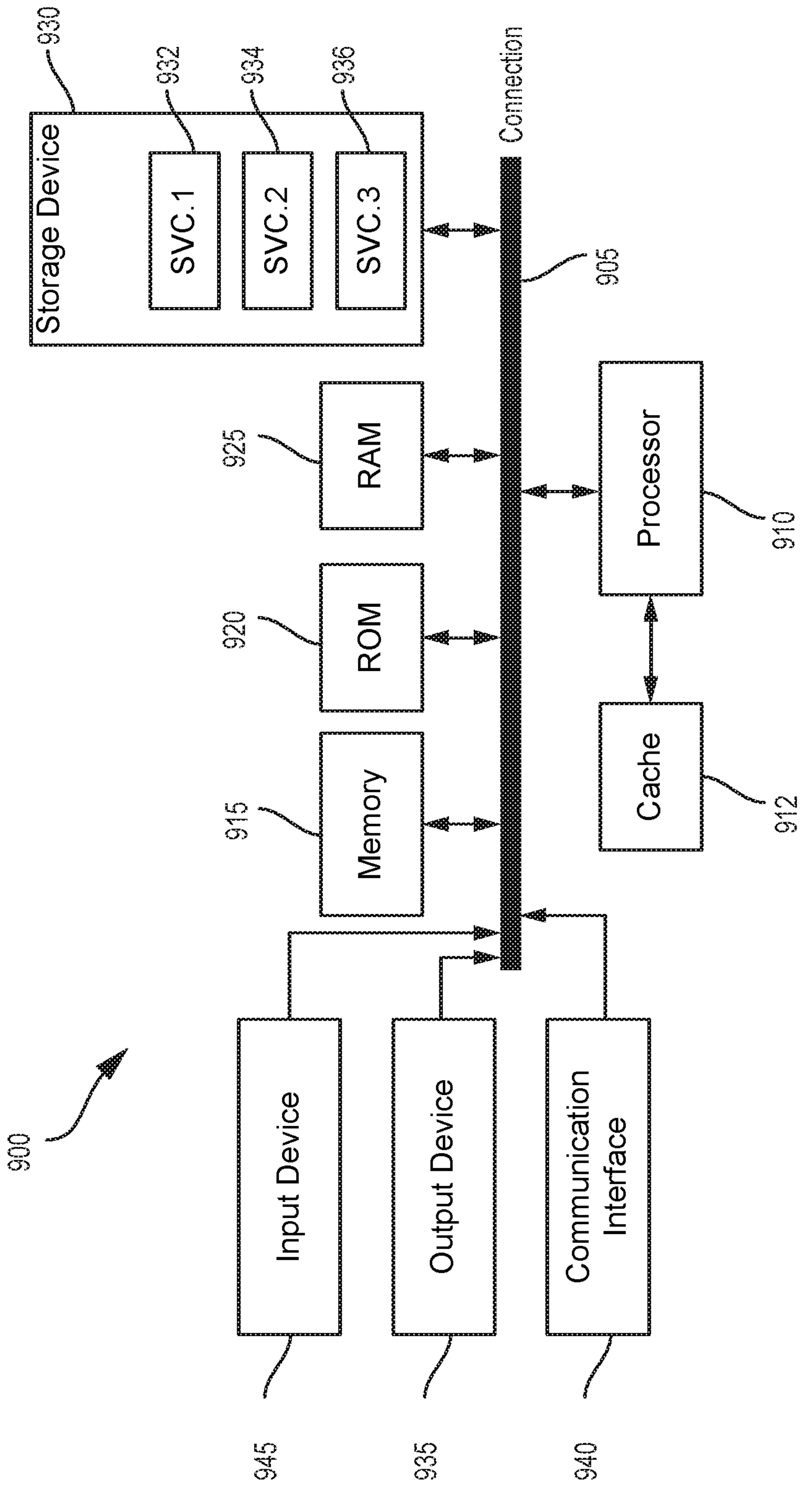
FIG. 9 is an example computing device architecture of an example computing device that can implement the various techniques described herein.

FIG. 9 illustrates an example computing device architecture 900 of an example computing device which can implement the various techniques described herein. For example, the computing device architecture 900 can implement the model compression system 300 shown in FIG. 3. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" means A, B, or A and B, but items not listed in the set of A, B, and C can also be included in the set.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method, comprising:

identifying a layer or branch of a neural network for modification based at least in part on either or both of (a) a number of weights associated with the layer or branch being above a weight threshold, or (b) a number of floating point operations (FLOPS) associated with the layer or branch being above a FLOPS threshold, the layer or branch comprising a set of filters, each filter in the set of filters including a plurality of weights;

generating a duplicate of the layer or branch including a duplicate set of filters, each filter in the duplicate set of filters including a copy of a filter in the set of filters;

processing input data using the set of filters to generate an output of the set of filters, wherein weights of the set of filters are fixed;

processing the input data using the duplicate set of filters to generate an output of the duplicate set of filters;

minimizing a loss function of an error between the output of the set of filters of the identified layer or branch and the output of the duplicate set of filters of the duplicate of the layer or branch and a penalty, wherein the penalty is an L1 regularization applied to one or more scaling factors associated with the duplicate set of filters;

determining one or more candidate filters for removal from the neural network based on minimizing the loss function;

generating a modified duplicate set of filters by removing the one or more candidate filters from the duplicate set of filters;

training the modified duplicate set of filters by updating weights and scaling factors of the modified duplicate set of filters based on the output of the set of filters; and modifying the identified layer or branch of the neural network by replacing the set of filters in the identified layer or branch of the neural network with the modified duplicate set of filters to yield a compressed neural network.

2. The method of claim 1, wherein the one or more candidate filters are determined based on a scaling factor of the one or more candidate filters having a value less than a scaling factor threshold.

3. The method of claim 1, wherein the set of filters is identified from a plurality of filters in the neural network based on at least one of a number of weights associated with the set of filters being higher than a weight threshold and a number of FLOPS associated with the set of filters being higher than a FLOPS threshold.

4. The method of claim 3, wherein at least one filter from the plurality of filters in the neural network is excluded from the set of filters based on at least one of a number of weights associated with the at least one filter being lower than the weight threshold and a number of FLOPS associated with the at least one filter being less than the FLOPS threshold.

5. The method of claim 1, wherein the neural network is trained using a set of training data prior to identifying the set of filters from the neural network, and further comprising re-training the modified duplicate set of filters using the set of training data.

6. The method of claim 1, wherein the neural network is a multi-branch neural network including a plurality of branches, each branch including at least one layer, and wherein the set of filters includes filters of a branch of the multi-branch neural network.

7. The method of claim 1, wherein the error includes a mean squared error.

8. The method of claim 1, further comprising minimizing the loss function by iteratively determining the error between the output of the set of filters and the output of the duplicate set of filters and the penalty applied to the one or more scaling factors associated with the duplicate set of filters.

9. A system for processing one or more images, comprising:

one or more processors; and memory accessible to the one or more processors, the memory storing instructions, which upon execution by the one or more processors, cause the one or more processors to:

identify a layer or branch of a neural network for modification based at least in part on either or both of (a) a number of weights associated with the layer or branch being above a weight threshold, or (b) a number of floating point operations (FLOPS) associated with the layer or branch being above a FLOPS threshold, the layer or branch comprising a set of filters, each filter in the set of filters including a plurality of weights;

generate a duplicate of the layer or branch including a duplicate set of filters, each filter in the duplicate set of filters including a copy of a filter in the set of filters;

process input data using the set of filters to generate an output of the set of filters, wherein weights of the set of filters are fixed;

process the input data using the duplicate set of filters to generate an output of the duplicate set of filters;

minimize a loss function of an error between the output of the set of filters of the identified layer or branch and the output of the duplicate set of filters of the duplicate of the layer or branch and a penalty, wherein the penalty is an L1 regularization applied to one or more scaling factors associated with the duplicate set of filters;

determine one or more candidate filters for removal from the neural network based on minimizing the loss function;

generate a modified duplicate set of filters by removing the one or more candidate filters from the duplicate set of filters;

train the modified duplicate set of filters by updating weights and scaling factors of the modified duplicate set of filters based on the output of the set of filters; and modify the identified layer or branch of the neural network by replacing the set of filters in the identified layer or branch of the neural network with the modified duplicate set of filters to yield a compressed neural network.

10. The system of claim 9, wherein the one or more candidate filters are determined based on a scaling factor of the one or more candidate filters having a value less than a scaling factor threshold.

11. The system of claim 9, wherein the set of filters is identified from a plurality of filters in the neural network based on at least one of a number of weights associated with the set of filters being higher than a weight threshold and a number of FLOPS associated with the set of filters being higher than a FLOPS threshold.

12. The system of claim 11, wherein at least one filter from the plurality of filters in the neural network is excluded from the set of filters based on at least one of a number of weights associated with the at least one filter being lower than the weight threshold and a number of FLOPS associated with the at least one filter being less than the FLOPS threshold.

13. The system of claim 9, wherein the neural network is trained using a set of training data prior to identifying the set of filters from the neural network, and further comprising re-training the modified duplicate set of filters using the set of training data.

14. The system of claim 9, wherein the neural network is a multi-branch neural network including a plurality of branches, each branch including at least one layer, and wherein the set of filters includes filters of a branch of the multi-branch neural network.

15. The system of claim 9, wherein the error includes a mean squared error.

16. The system of claim 9, the memory storing instructions, which upon execution by the one or more processors, cause the one or more processors to minimize the loss function by iteratively determining the error between the output of the set of filters and the output of the duplicate set of filters and the penalty applied to the one or more scaling factors associated with the duplicate set of filters.

17. A non-transitory computer-readable medium having stored thereon instructions that, when executed by one or more processors, cause the one or more processors to:

identify a layer or branch of a neural network for modification based at least in part on either or both of (a) a number of weights associated with the layer or branch being above a weight threshold, or (b) a number of floating point operations (FLOPS) associated with the layer or branch being above a FLOPS threshold, the layer or branch comprising a set of convolutional filters, each convolutional filter in the set of convolutional filters including a plurality of weights;

generate a duplicate of the layer or branch including a duplicate set of convolutional filters, each convolutional filter in the duplicate set of convolutional filters including a copy of a convolutional filter in the set of convolutional filters;

process input data using the set of convolutional filters to generate an output of the set of convolutional filters, wherein weights of the set of convolutional filters are fixed;

process the input data using the duplicate set of convolutional filters to generate an output of the duplicate set of convolutional filters;

minimize a loss function of an error between the output of the set of convolutional filters of the identified layer or branch and the output of the duplicate set of convolutional filters of the duplicate of the layer or branch and a penalty, wherein the penalty is an L1 regularization applied to one or more scaling factors associated with the duplicate set of convolutional filters;

determine one or more candidate convolutional filters for removal from the neural network based on minimizing the loss function;

generate a modified duplicate set of convolutional filters by removing the one or more candidate convolutional filters from the duplicate set of convolutional filters;

train the modified duplicate set of filters by updating weights and scaling factors of the modified duplicate set of filters based on the output of the set of filters; and modify the identified layer or branch of the neural network by replacing the set of convolutional filters in the identified layer or branch of the neural network with the modified duplicate set of convolutional filters to yield a compressed neural network.

18. The non-transitory computer-readable medium of claim 17, wherein the one or more candidate convolutional filters are determined based on a scaling factor of the one or more candidate convolutional filters having a value less than a scaling factor threshold.

19. The non-transitory computer-readable medium of claim 17, wherein the set of convolutional filters is identified from a plurality of convolutional filters in the neural network based on at least one of a number of weights associated with the set of convolutional filters being higher than a weight threshold and a number of FLOPS associated with the set of convolutional filters being higher than a FLOPS threshold, and wherein at least one convolutional filter from the plurality of convolutional filters in the neural network is excluded from the set of convolutional filters based on at least one of a number of weights associated with the at least one convolutional filter being lower than the weight threshold and a number of FLOPS associated with the at least one convolutional filter being less than the FLOPS threshold.

20. The non-transitory computer-readable medium of claim 17, wherein the neural network is trained using a set of training data prior to identifying the set of convolutional filters from the neural network, and further comprising re-training the modified duplicate set of convolutional filters using the set of training data.

* * * * *